United States Patent [19]

Sugasawa et al.

[11] Patent Number: 5,075,855
[45] Date of Patent: * Dec. 24, 1991

[54] AUTOMOTIVE SUSPENSION CONTROL SYSTEM WITH ROAD-CONDITION-DEPENDENT DAMPING CHARACTERISTICS

[75] Inventors: Fukashi Sugasawa; Ken Ito, both of Yokohama; Tohru Takahashi, Yokosuka; Sadahiro Takahashi, Yokosuka; Takeshi Fujishiro, Yokosuka, all of Japan

[73] Assignee: Nissan Motor Company, Limited, Japan

[*] Notice: The portion of the term of this patent subsequent to Sep. 13, 2005 has been disclaimed.

[21] Appl. No.: 576,076

[22] Filed: Sep. 25, 1990

Related U.S. Application Data

[62] Division of Ser. No. 157,790, Feb. 19, 1988, Pat. No. 4,967,359, Division of Ser. No. 691,531, Jan. 15, 1985, Pat. No. 4,770,438.

[30] Foreign Application Priority Data

Jan. 20, 1984 [JP] Japan ............................. 59-8196
Jan. 20, 1984 [JP] Japan ............................. 59-8199

[51] Int. Cl.⁵ .................................... B60G 17/08
[52] U.S. Cl. ....................... 364/424.05; 280/707; 73/105
[58] Field of Search ............ 364/424.05, 550, 551.01; 73/105; 280/707; 180/169

[56] References Cited

U.S. PATENT DOCUMENTS

| 4,148,027 | 4/1979 | Nowdgrodzki | 73/105 |
|---|---|---|---|
| 4,600,215 | 7/1986 | Kuroki et al. | 280/707 |
| 4,616,848 | 10/1986 | Sugasawa et al. | 280/707 |
| 4,639,014 | 1/1987 | Tanaka et al. | 280/707 |
| 4,651,290 | 3/1987 | Masaki et al. | 73/105 |
| 4,674,767 | 6/1987 | Kuroki et al. | 280/707 |
| 4,696,489 | 9/1987 | Fujishiro et al. | 280/707 |
| 4,717,173 | 1/1988 | Sugasawa et al. | 280/707 |
| 4,741,554 | 5/1988 | Okamoto | 280/707 |
| 4,770,438 | 9/1988 | Sugasawa | 280/707 |
| 4,809,197 | 2/1989 | Tashiro et al. | 73/105 |
| 4,837,727 | 6/1989 | Tashiro et al. | 364/551.01 |
| 4,912,967 | 4/1990 | Shiraishi et al. | 73/105 |

Primary Examiner—Gary Chin
Attorney, Agent, or Firm—Leydig, Voit & Mayer

[57] ABSTRACT

A suspension control system for automotive vehicles automatically adjusts the damping strength of variable shock absorbers or other dampers in accordance with road surface conditions as recognized by frequency analysis of a vehicle height or vibration sensor signal. The sensor signal reflects vertical displacement of the vehicle body from the road surface and includes high-frequency components due solely to displacement of the wheels or unsprung mass relative to the road surface and low-frequency components due to displacement of the vehicle body or sprung mass. The sensor signal is filtered into these separate frequency bands, the amplitude of each of which is compared to a corresponding reference level. The results of comparison give an indication of the degree and scale of irregularities in the road surface; specifically, a high-amplitude low-frequency component indicates larger-scale bumps and dips capable of bouncing the vehicle whereas a strong high-frequency component reflects a rough-textured road surface, such as gravel. The comparison information is sent to a suspension system controller which causes actuation of the shock absorbers to a stiffer mode of operation when the low-frequency sensor signal components are relatively strong.

2 Claims, 16 Drawing Sheets

SMOOTH

POORLY SURFACED

ROUGH

UNDULANT

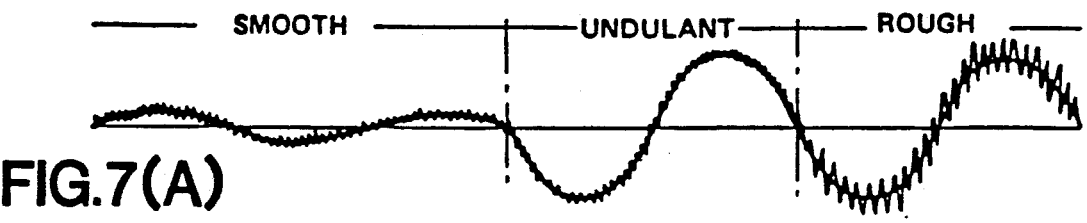
FIG.7(A)
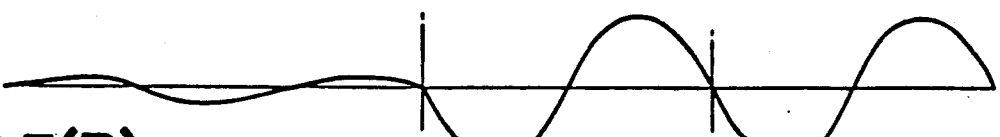
FIG.7(B)
FIG.7(C)
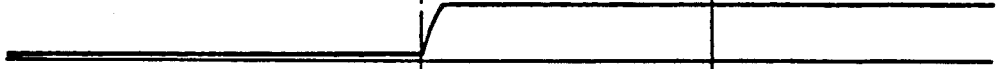
FIG.7(D)
FIG.7(E)
FIG.8
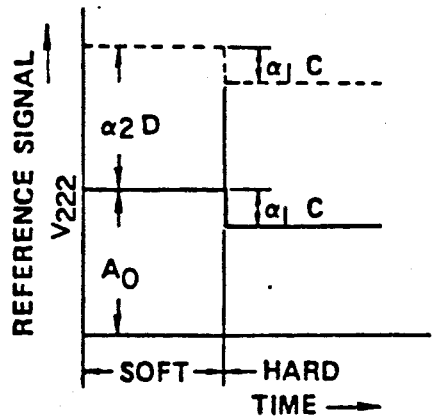
FIG.9
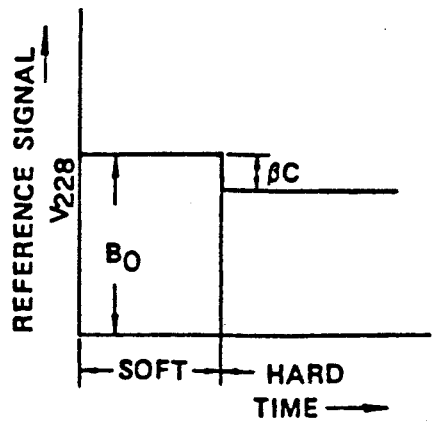

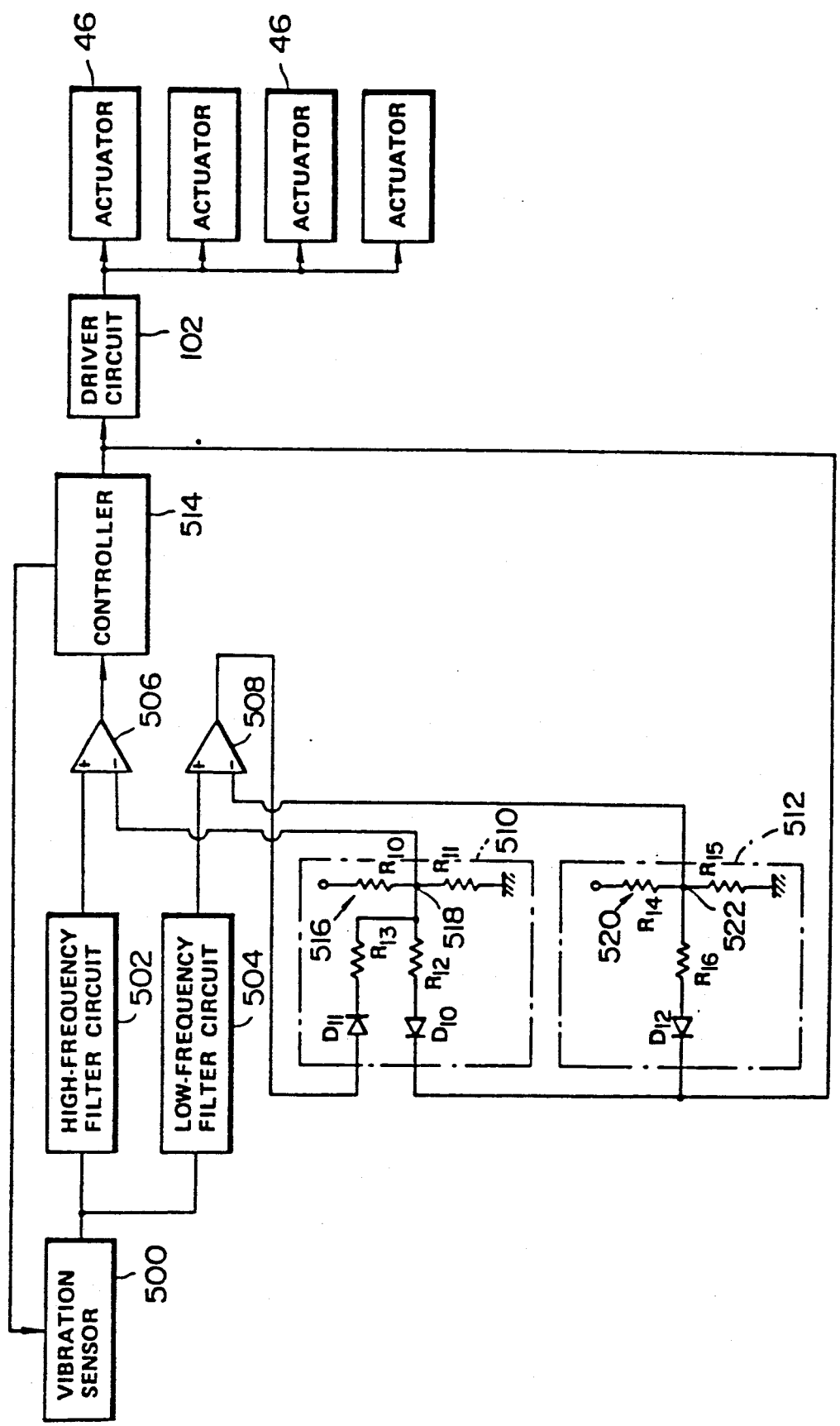

AUTOMOTIVE SUSPENSION CONTROL SYSTEM WITH ROAD-CONDITION-DEPENDENT DAMPING CHARACTERISTICS

This application is a division of prior application Ser. No. 07/157,790, filed on Feb. 19, 1988, now U.S. Pat. No. 4,967,359, which is a division of prior application Ser. No. 06/691,531, filed Jan. 15, 1985, now U.S. Pat. No. 4,770,438.

BACKGROUND OF THE INVENTION

The present invention relates generally to a suspension control system for an automotive vehicle with variable damping force depending upon road surface condition. More specifically, the invention relates to a suspension control system which includes a sensor monitoring road surface conditions for use in controlling the stiffness of the suspension in accordance therewith.

Various uses of road preview sensors have been proposed and developed. For example, SAE Technical Paper Series Nos. 680750 and 800520, respectively published on October, 1968 and February, 1980 show road preview sensors for use in suspension systems for obtaining optimum riding comfort and drivability. In addition, Japanese Patent First Publication No. 57-172808, published on Oct. 23, 1982 discloses a vehicle height control system which includes a sensor which detects rough road conditions and adjusts the vehicle height level depending upon road surface conditions. A vehicle height or level sensor is employed in the disclosed vehicle height control system for monitoring the relative displacement between the vehicle body and wheel axle. The output of the vehicle level sensor is compared with a reference level, which serves as a rough road criterion, and adjusts the vehicle height according to the result of judgment of the road surface conditions.

In another example, Japanese Patent First Publication No. 58-30542, published on Feb. 23, 1983, discloses a variable damping force shock absorber with damping characteristics varying in accordance with vehicle driving conditions. In the disclosed system, the magnitude of relative displacement between the vehicle body and wheel axle is measured and a vehicle height variation indicative signal is derived from the measured displacement and the instantaneous vehicle speed. The vehicle height variation indicative signal value is compared with a reference value which serves as a staff suspension criterion for adjustment of the damping characteristics of the shock absorber in accordance therewith.

Conventional suspension control systems encounter difficulty in recognizing the nature of vibrations causing relative displacement between the vehicle body and the wheel axle. For instance, when the road wheel vibrates due to small-scale irregularities in the road surface, a softer or weaker suspension may be preferred in order to provide sufficient riding comfort. On the other hand, when the vehicle body vibrates on a larger scale, i.e. if it starts to roll or pitch, a stiffer suspension is preferable to provide riding comfort and better drivability.

SUMMARY OF THE INVENTION

Therefore, it is an object of the invention to provide a suspension control system which overcome drawbacks in the prior art and can provide both riding comfort and drivability by recognizing whether relative displacement between vehicle body and road wheels is due to vibration of the wheel or of the body relative to the plane of the road.

A more specific object of the present invention is to provide a suspension control system which includes a sensor capable of distinguishing between road surface conditions which cause road wheel vibrations and those which cause vehicle body vibrations so that the suspension is stiffened only when the relative displacement due to vehicle body vibrations, such as rolling or pitching, is recognized.

In order to accomplish the aforementioned and other objects, a suspension control system, according to the invention, includes a sensor producing a signal having an amplitude corresponding to the magnitude of the relative displacement between a vehicle body and a road wheel and having only frequency components corresponding to possible frequencies of vibration of the vehicle body. A first comparator compares the amplitude of a predetermined first higher-frequency range of signal components with a first reference level so as to detect the magnitude of vibration of the road wheel. The first comparator produces a high-level first comparator signal when the magnitude of the higher-frequency range vibrations is greater than the first reference level. A second comparator compares the amplitude of a predetermined second lower-frequency range of signal components with a second reference level so as to detect the magnitude of vibrations of the vehicle body. The second comparator produces a high-level second comparator signal when the magnitude of the lower-frequency range vibrations is greater than the second reference level. A controller analyzes road surface conditions on the basis of at least the second comparator signal level. The controller produces a control signal which triggers a variable-damping-characteristics suspension mechanism to adjust the damping characteristics between a stiffer suspension mode and a softer suspension mode depending upon the road surface conditions.

BRIEF DESCRIPTION OF THE DRAWINGS

The following drawings, throughout which like numerals refer to like elements, may be of assistance in understanding the concepts behind the present invention and the structure, function and purpose of some preferred embodiments thereof:

FIGS. 7(A)-7(E) are the timings of some typical waveforms appearing in the circuitry of FIG. 3;

FIG. 8, a diagram of possible states of a low-frequency reference signal;

FIG. 9, a diagram of possible states of a high-frequency reference signal;

FIG. 15, a block diagram similar to FIG. 3 of a second preferred embodiment;

DESCRIPTION OF THE PREFERRED EMBODIMENT

Figure 1:
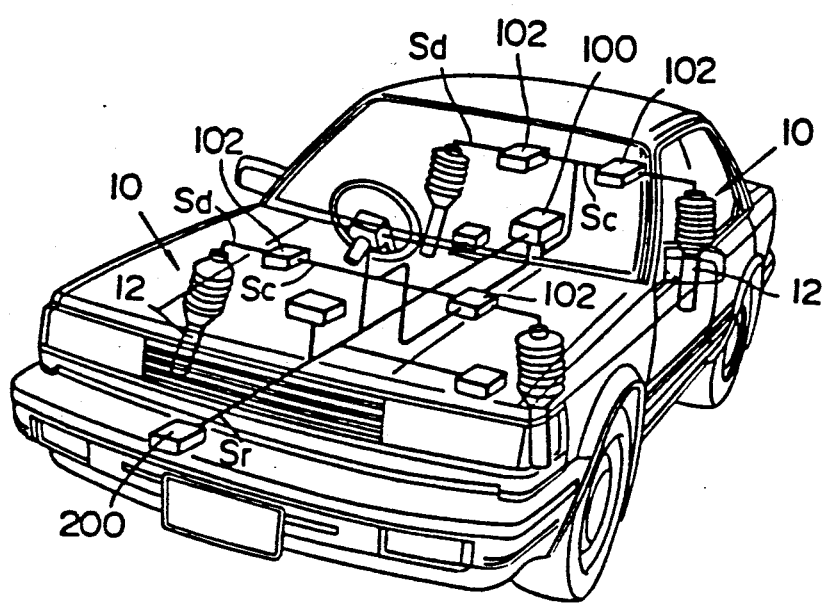
FIG. 1, a diagram of major elements of, a typical vehicular suspension system and of a first preferred embodiment of a suspension control system.

Referring now to the drawings, particularly to FIG. 1, the preferred embodiment of an electronic suspension control system in accordance with the present invention generally comprises suspension strut assemblies 10, each including a shock absorber 12 with variable shock-absorbing characteristics and a controller 100 adapted to produce a control signal for actuating an actuator (not shown in FIG. 1) in each shock absorber 12 in order to adjust the shock-absorbing characteristics in accordance with the vehicle driving condition.

It should be appreciated that the term "shock-absorbing characteristics" used throughout the disclosure refers to the quantitative degree to which a shock absorber produces damping force or spring force against bounding and rebounding motion of the vehicle body as a sprung mass and the road wheel assembly as unsprung mass, and pitching and rolling movement of the vehicle body relative to the road wheel assembly. In practice, the shock-absorbing characteristics can be controlled in various ways based on flow restriction between shock absorber working chambers disposed in shock absorber cylinders. In the shown embodiment, the flow restriction is variable by means of a flow control valve disposed within a reciprocable piston separating the chambers. The preferred embodiment described herebelow employs a shock absorber with two-way variable shock-absorbing characteristics, i.e. HARD mode and SOFT mode. Obviously, in HARD mode, the damping force generated in response to bounding or rebounding shock applied to the vehicle is greater than in SOFT mode. However, the shown embodiment is to be considered merely as an example for facilitating better understanding of the invention and simplification of the disclosure. In fact, shock absorbers which operate in three modes, i.e. HARD mode, SOFT mode and INTERMEDIATE or MEDIUM mode, are also applicable to the preferred embodiment of the suspension control system according to the invention. Some possible modifications to the shock absorber will be disclosed together with the preferred shock absorber design given later.

Returning to FIG. 1, the controller 100 is connected to a road surface sensor 200 which produces a sensor signal $S_r$ indicative of road surface conditions, which will be referred to hereinafter as "road sensor signal $S_r$". The controller 100 may also be connected to sensors, such as a vehicle speed sensor, a brake switch, etc., in order to receive the sensor signals indicative of the suspension control parameters. The controller 100 is, in turn, connected to driver signal generators 102 which are responsive to the control signal from the controller, which control signal $S_c$ can assume either of two states, namely HIGH and LOW. The driver signal generator 102 produces a drive signal $S_d$ which actuates the shock absorber to one of the HARD and SOFT modes.

Figure 2A:
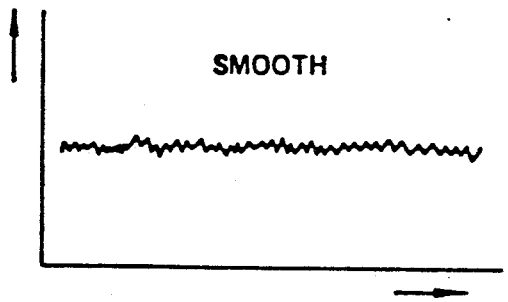
FIGS. 2(A)-2(D) are some examples of road surface sensor signals characteristic of distinct road conditions.
Figure 2B:
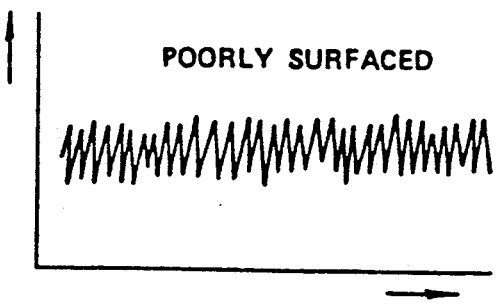
Figure 2C:
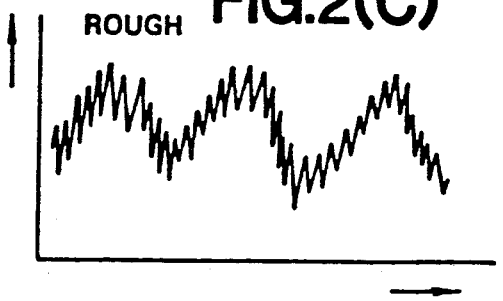
Figure 2D:
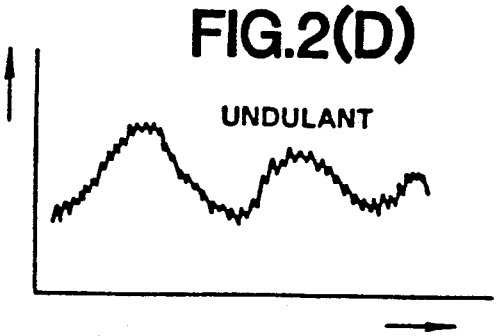

The controller 100 is responsive to the road sensor signal $S_r$ to produce a control signal $S_c$ for switching the shock absorber between HARD mode and SOFT mode. The general concepts of road surface-dependent suspension control will be described herebelow with respect to FIGS. 2(A) to 2(D). FIG. 2(A) shows the waveform of the road sensor signal $S_r$ as the vehicle travels over a relatively smooth road. FIG. 2(B) shows a waveform of the road sensor signal as the vehicle moves along a graded but poorly surfaced road, such as a gravel road. FIG. 2(C) shows the waveform of the road sensor signal as the vehicle travels along a very rough road. FIG. 2(D) shows the waveform of the road sensor signal as the vehicle travels along an undulant but well-surfaced road.

Generally speaking, softer or lower damping-force characteristics are preferable from the standpoint of good driving comfort. Thus, when travelling along a relatively smooth road, the SOFT mode of the shock absorber is preferable. In addition, in order to absorb relatively high-frequency vibrations caused by an uneven road surface, a SOFT suspension is preferred. On the other hand, when the vehicle is travelling on a relatively rough or undulant road, the vehicle body may tend to bounce due to abrupt vertical displacements. In this case, pitch suppression becomes the most important factor for riding comfort and driving stability.

It should be apparent that as the road wheel vibrates due to a rough road surface, it generates high-frequency components in the road sensor signal. On the other hand, large-scale vehicle body vibrations as in lateral rolling or vertical pitching motions are reflected in the low-frequency components of the road sensor signal. Therefore, in the shown system, the road surface conditions, whether a relatively smooth road (A), an uneven road (B), a relatively rough road (C) or an undulant road (D), can be recognized by separately monitoring the high- and low-frequency components of the road sensor signals.

Figure 3:
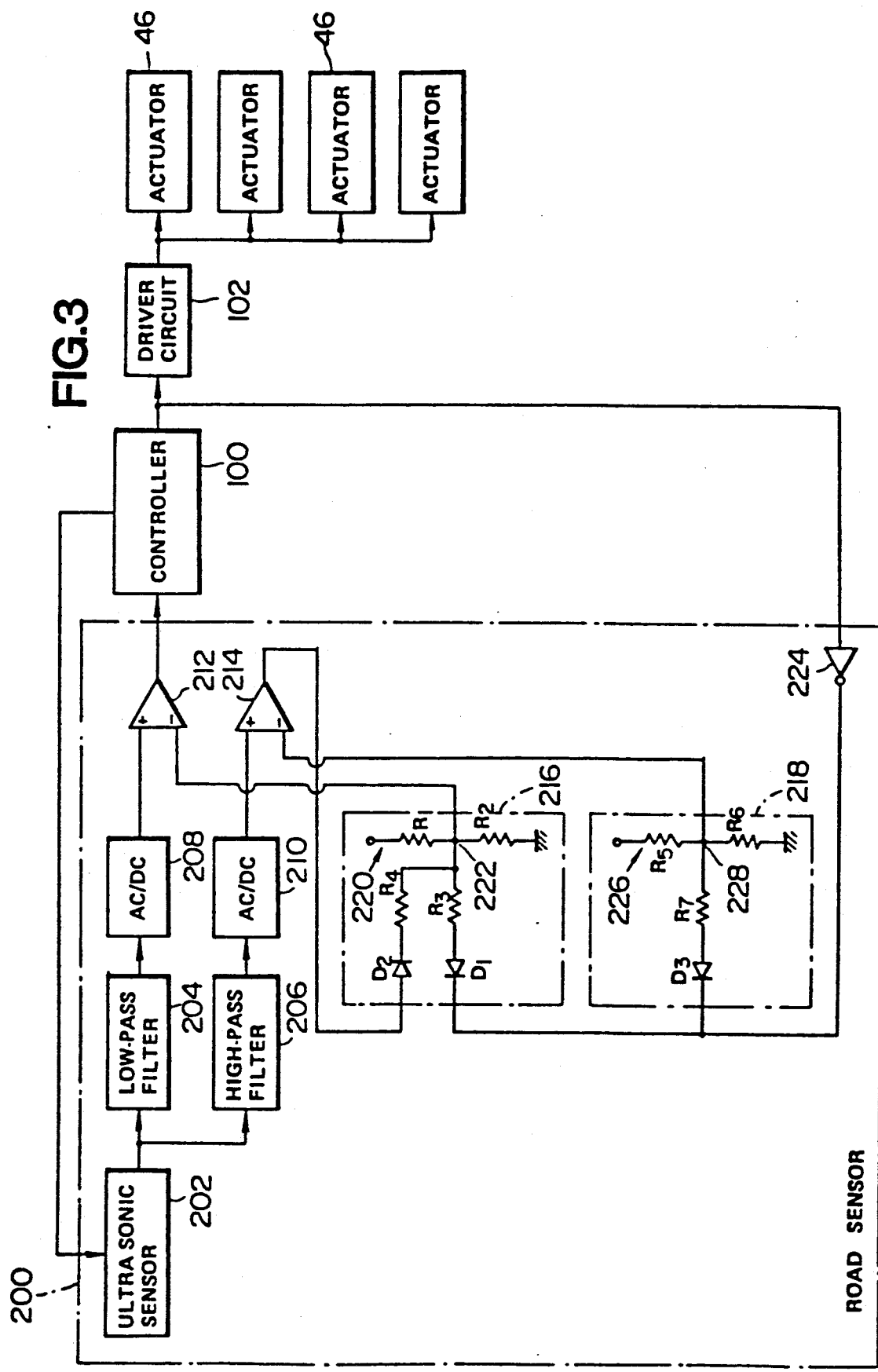
FIG. 3, a more detailed block diagram of the suspension control system of FIG. 1.

FIGS. 3 to 10 show the first preferred embodiment of the suspension control system according to the present invention. FIG. 3 shows the circuit layout of the first embodiment of the suspension control system of the invention. The road sensor 200 comprises an ultra-sonic sensor 202 which will be described later with reference to FIGS. 5 and 6, a pair of band-pass filters 204 and 206, AC-DC converters 208 and 210, and comparators 212 and 214. The band-pass filter 204 serves as low-pass filter for filtering the high-frequency components out of the output signal of the ultra-sonic sensor 202 (FIG. 7(A)) in order to pick up only the low-frequency components as shown in FIG. 7(B). The low-pass filter 204 is connected to the AC-DC converter 208. The AC-DC converter 208 converts the output signal of the low-pass filter indicative of the amplitude of the low-frequency components of the ultra-sonic sensor output signal into a corresponding direct-current signal as shown in FIG. 7(D). The AC-DC converter 208 is connected for output to the non-inverting input terminal of the comparator 212. Similarly, the band-pass filter 206 is adapted to filter the low-frequency components out of the ultra-sonic sensor output signal so as to pick up only the high-frequency components as shown in FIG. 7(C). The output signal of the high-pass filter 206 is fed to the AC-DC converter 210. The AC-DC converter 210 produces a direct-current signal shown in FIG. 7(E) indicative of the amplitude of the high-frequency components of the ultra-sonic sensor output signal. The direct current level signal output from the AC-DC converter 210 is applied to the comparator 214 through the non-inverting input terminal.

The inverting input terminals of the comparators 212 and 214 receive inputs from reference signal generators 216 and 218 respectively. The reference signal generator 216 has a voltage divider 220 consisting of resistors $R_1$ and $R_2$. The junction 222 through which the reference signal generator 216 is connected to the inverting input terminal of the comparator 212, is connected to the output terminal of the comparator 214 via a diode $D_2$ and a resistor $R_4$. The junction 222 is also connected to the controller 100 via an inverter 224, a diode $D_1$ and a resistor $R_3$ for purposes discussed later. With this arrangement, the signal level D of the reference signal produced by the reference signal generator 216 varies depending upon the output of the comparator 214 and the signal level C of control signal $S_c$ from the controller. In practice, the reference signal level of the reference signal generator 216 can be obtained from the following equation:

$$A = A_0 - a_1 \times C + a_2 \times D \ldots \quad (1)$$

where
- A is the signal level of the reference signal of the reference signal generator 216;
- $A_0$ is the source voltage determined by the voltage divider 220 at the junction 222;
- $a_1$ is a constant determined by resistance value of the resistor $R_3$;
- $a_2$ is a constant determined by resistance value of the resistor $R_4$.
- C is a binary value determined by the control signal $S_c$; and
- D is a binary value determined by the output of the comparator 214.

Similarly, the reference signal generator 218 has a voltage divider 226 consisting of a pair of resistors $R_5$ and $R_6$. A junction 228 between the resistors $R_5$ and $R_6$ is connected to the inverting input terminal of the comparator 216. In addition, the junction 228 is connected to the controller 100 via the inverter 224, a diode $D_3$ and a resistor $R_7$. With this arrangement, the signal level of the reference signal produced by the reference signal generator 218 varies depending upon the signal level of the control signal from the controller 100. In practice, the signal level of the reference signal of the reference signal generator 218 can be obtained from the following equation:

$$B = B_0 - \beta \times C \ldots \quad (2)$$

where
- B is the signal level of the reference signal of the reference signal generator 218;
- $B_0$ is the source voltage determined by voltage divider 226
- $\beta$ is a constant determined by the resistance value of the resistor $R_7$; and
- C is a binary value determined by the control signal $S_c$.

The controller 100 is connected for input from the output terminal of the comparator 212 and outputs a control signal value at either a HIGH level, by which the shock absorber is shifted to HARD mode or at a LOW level shifting the shock absorber to the SOFT mode.

Figure 4:
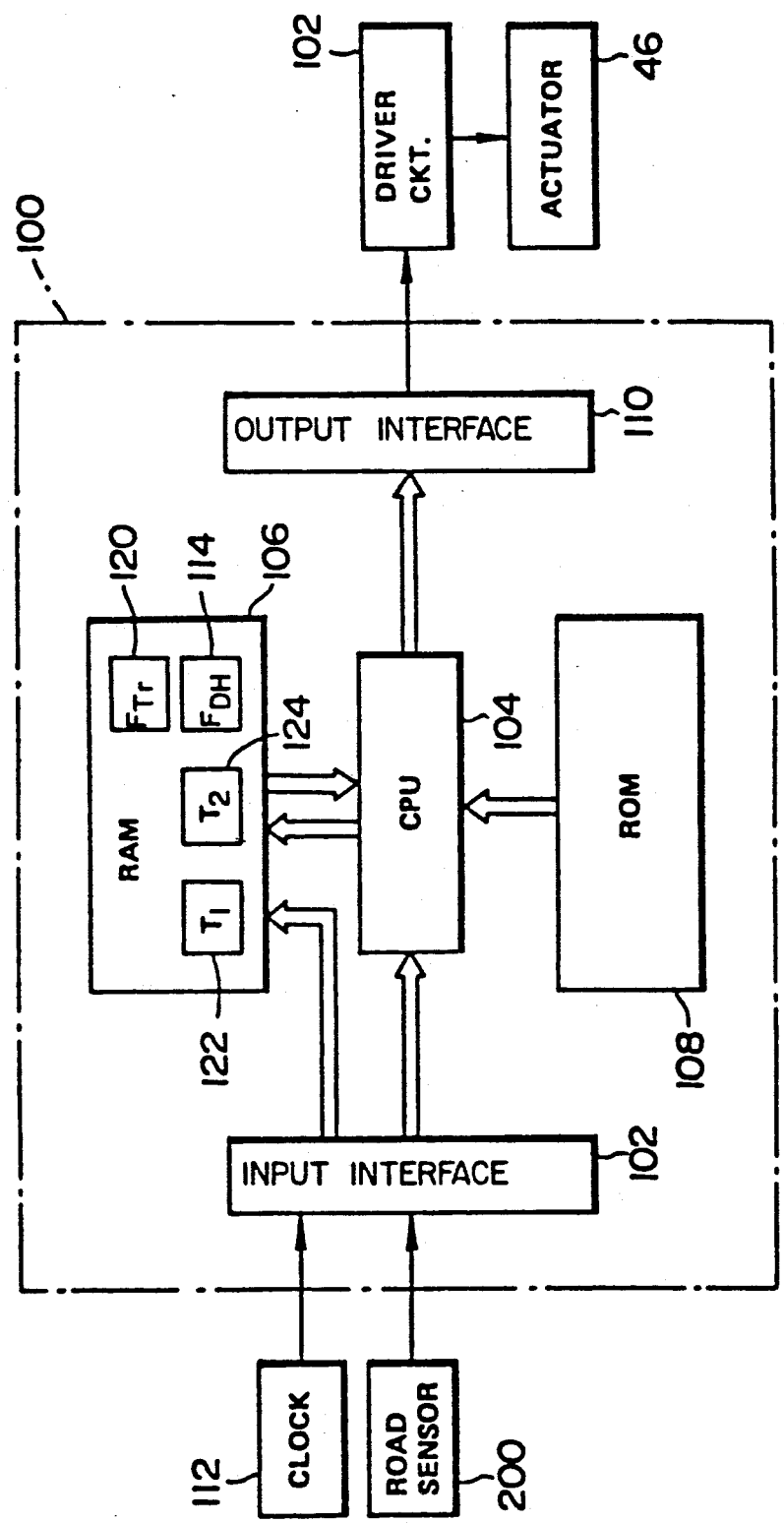
FIG. 4, a more detailed block diagram of the controller of FIG. 3.

FIG. 4 shows the controller 100 which generally comprises a microprocessor. In practice, the microprocessor performs control operations not only depending upon the road surface conditions but also depending upon vehicle speed, other vehicle driving conditions, such as vehicle acceleration, and other preselected suspension control parameters. One of these suspension control parameters, is the HIGH- or LOW-level output signal from the comparator 214, which switch the damping characteristics of the shock absorber between the HARD and SOFT modes respectively.

The microprocessor 100 generally comprises an input interface 102, CPU 104, RAM 106, ROM 108 and output interface 110. In the shown embodiment, the microprocessor 100 is connected to the road sensor 200 via the input interface 102. The microprocessor 100 is also connected for input from a clock generator 112. RAM 106 includes a memory block 114 serving as a mode-indicative flag $F_{DH}$ which is set while the shock absorber is operating in HARD mode. ROM 108 includes a memory block 116 holding the road surface-dependent suspension control program as an interrupt program triggered by a HIGH-level signal from the comparator 214. ROM 108 also has a memory block 118 storing an ultra-sonic sensor control program which triggers the ultra-sonic sensor at a given timing. The output interface 110 of the microprocessor 100 is connected for output of control signal $S_c$ to each of the driver signal generators.

Figure 5:
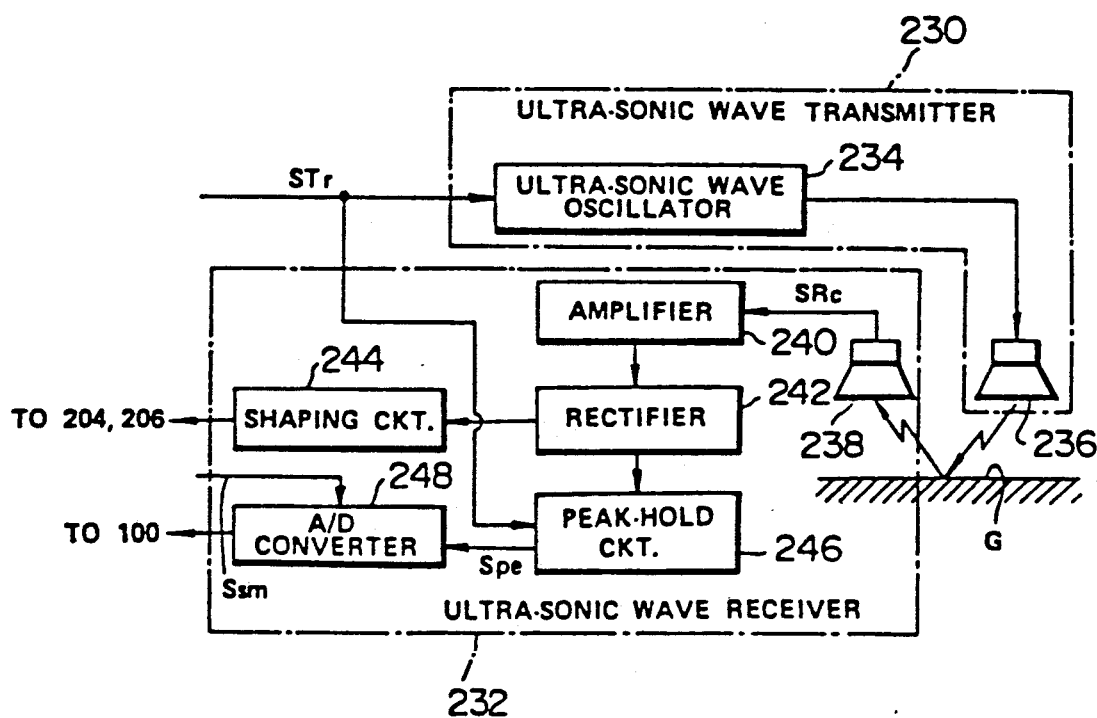
FIG. 5, a more detailed block diagram of the ultrasonic sensor of FIG. 3.

As shown in FIG. 5, the ultra-sonic sensor 202 comprises generally an ultra-sonic wave transmitter 230 and a reflected ultra-sonic wave receiver 232. The transmitter 230 is associated with the controller 100 to receive therefrom a trigger signal $S_{Tr}$ at a given timing. The transmitter 230 includes an ultra-sonic oscillator 234 and an ultra-sonic wave transmitting section 236. The ultra-sonic oscillator 234 is responsive to the trigger signal $S_{Tr}$ from the controller 100, which is issued periodically or intermittently, to transmit or discharge ultra-sonic waves through the transmitter section 236 toward the road surface.

The ultra-sonic waves reflected by the road surface are received by a receiver section 238 of the receiver 232. The receiver section 238 produces a receiver signal $S_{Rc}$ having a value varying in accordance with the amplitude of the received ultra-sonic waves. The receiver section 238 is connected to an amplifier 240 to supply the receiver signa $S_{Rc}$ to the latter. The receiver signa $S_{Rc}$ is amplified by the amplifier 240 and transmitted to a rectifier 242. The rectifier 242 is connected to the band-pass filters 204 and 206 as set forth above, through a shaping circuit 244. The rectifier 242 is also connected to a peak-hold circuit 246 which holds the peak value of the receiver signal. The peak-hold circuit 246 produces an analog peak-value-indicative signal $S_{Pe}$ having a value proportional to the held peak value. The peak-hold circuit 246 is connected for output to the controller 100 via an analog-to-digital converter 248. The analog-to-digital converter 248 outputs a binary signal indicative of the peak-value-indicative signal value to the controller 100.

The peak-hold circuit 246 is also connected to the controller 100 to receive the trigger signal $S_{Tr}$. The peak-hold circuit 246 is responsive to the trigger signal from the controller to clear the currently held value.

Figure 6:
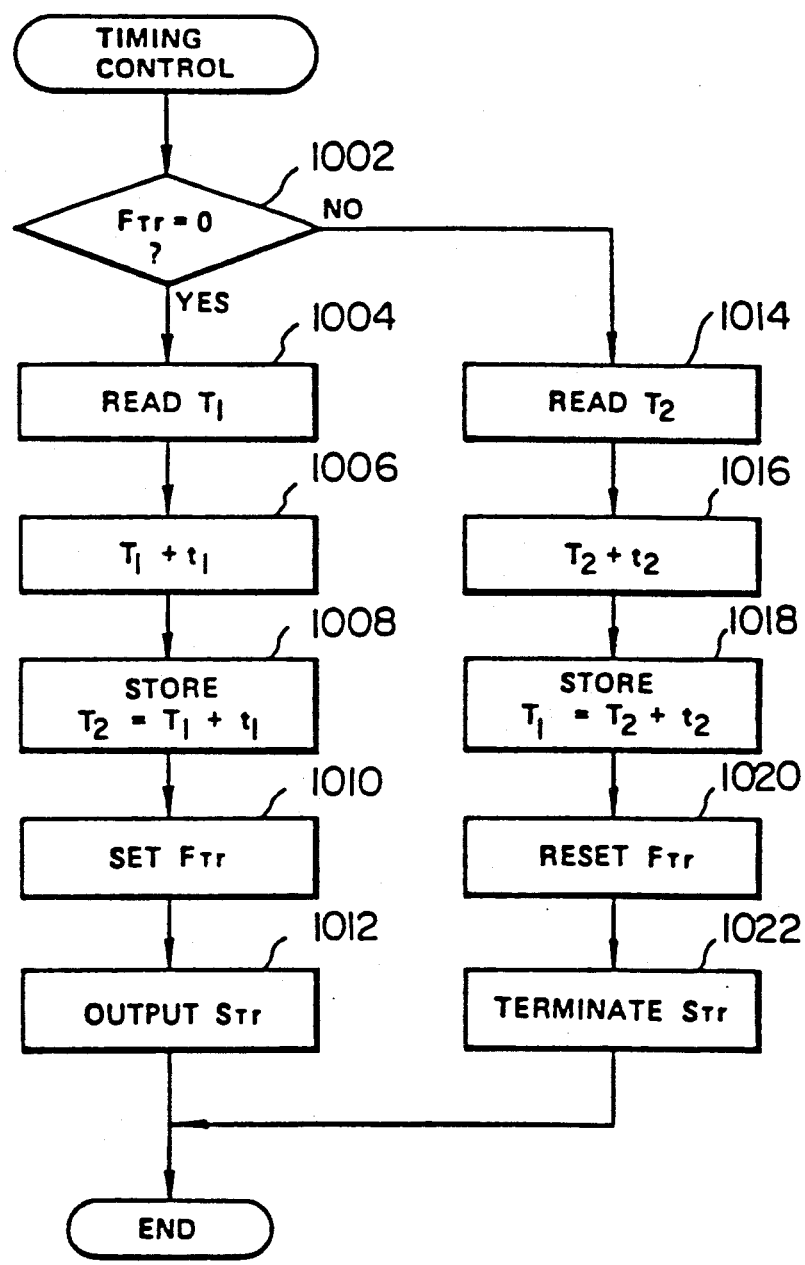
FIG. 6, a flowchart of an ultrasonic sensor timing control program executed by the controller of FIGS. 3 and 4.

FIG. 6 shows a timing control program executed by the controller 100 for controlling the trigger timing of the ultra-sonic sensor 200.

At the initial stage of execution of the timing control program, a trigger-signal-output-indicative flag $F_{Tr}$ in a memory block 120 of RAM is checked at a step 1002. The trigger signal $F_{Tr}$ is set when the trigger signal is output through the output interface 110 to the transmitter 230 and is reset when the trigger signal is not being output.

If the trigger signal-indicative flag $F_{Tr}$ is set when checked at the step 1002, then the timer value $T_1$ of a timer 122 in RAM is latched at a step 1004. The timer 122 continuously counts clock pulses from the clock generator 112. A trigger-signal-ON-time indicative time value $t_1$ is added to the latched timer value $T_1$ at a step 1006. The resultant value $(T_1+t_1)$, which serves as a trigger-signal-OFF time value, is transferred to and stored in a $T_2$-register 124 in RAM 106, at a step 1008. Then the flag $F_{Tr}$ is set at a step 1010. A HIGH-level output is applied to the output interface as trigger signal $S_{Tr}$ at a step 1012.

During the period $t_1$ starting from the time $T_1$, the potential at the output interface is held HIGH to continue application of the trigger signal $S_{Tr}$ to the transmitter 230. The timer 122 continues counting the clock pulses and produces a $T_1$-timer signal after period $t_1$ which serves as a trigger signal for the timing control program.

In response to the $T_1$-timer signal at time $T_2$ marking the end of the period $t_1$, the timing control program is executed again. Since the trigger signal-indicative flag $F_{Tr}$ was set at the step 1010 in the previous cycle of program execution, the answer at the step 1002 becomes "NO". Thus, control passes to a step 1014 in which the timer value $T_2$ of the second timer 124 is accessed in RAM 106. Similarly to the first-mentioned timer 122, the timer 124 continuously counts clock pulses from the clock generator 112. An OFF-interval-indicative time data $t_2$ is added to the latched timer value $T_2$ at a step 1016. The time data $t_2$ has a value corresponding to a predetermined interval between successive trigger signals. The resultant time value $(T_2+t_2)$ is stored in the $T_1$-timer 122 of RAM 106 at a step 1018. Then, the flag $F_{Tr}$ is reset at a step 1020. After the step 1020, the output level at the output interface drops to LOW to terminate transmission of the trigger signal to the transmitter, at a step 1022.

The detailed structure and operation of the aforementioned preferred embodiment of the ultra-sonic sensor has been disclosed in the co-pending U.S. Patent application Ser. No. 650,705, filed Sept. 14, 1984. The disclosure of the above-identified U.S. Patent application Ser. No. 650,705 is hereby incorporated by reference for the sake of disclosure.

The operation of the suspension control system as set forth above will be described with reference to FIGS. 7 to 9. As the vehicle travels over a relatively smooth road as illustrated by the zone labelled "SMOOTH" in FIG. 7(A), the output signal of the ultra-sonic sensor 202 is rather smooth and amplitudes of both the high- and low-frequency components small and regular. The output of the ultra-sonic sensor 202 is filtered by the low-pass filter 204 and the high-pass filter 206 as respectively illustrated in FIGS. 7(B) and 7(C). Therefore, the output levels of the AC-DC converters 208 and 210 remain LOW, as shown in FIGS. 7(D) and 7(E). The outputs of the AC-DC converters 208 and 210 are respectively input to the non-inverting input terminals of the comparators 212 and 214.

At this time, since the signal level of the control signal issued by the controller 100 remains LOW, as will become obvious later, the logical value of the output of the inverter 224 become "1" (HIGH). The diodes $D_1$ and $D_3$ are thus non-conductive. As a result, current flowing through the resistors $R_3$ and $R_7$ drops to zero. Therefore, the potential at the junction 228 rises into correspondence with the divided power source voltage $B_0$. As shown in FIG. 9, at this condition, the reference signal level HL to be applied to the inverting input terminal of the comparator 214 therefore becomes higher level. As a result, the logical value of the output of the comparator 214 remains "0" (LOW).

Since, the diode $D_1$ is cut off to block current flow through the resister $R_3$ and the logical value of the output of the comparator 214 remains "0", the potential at the junction 222 corresponds to the power source voltage as divided by the voltage divider 220, i.e. $A_0$, as shown by the solid line in FIG. 8. At this time, since amplitude of low-frequency component of the output of the ultra-sonic sensor 202 input to the non-inverting input terminal of the comparator 212 via AC-DC converter 208 is smaller than the HARD/SOFT criterion represented by the reference voltage $A_0$, the output of the comparator 212 remains low. Therefore, the control signal produced by the controller 100 is LOW, holding the shock absorber in SOFT mode.

As the vehicle starts to travel over a road full of dips and bumps as illustrated in the zone "UNDULANT" in FIG. 7(A), vibration of the vehicle body as a whole causing rolling and pitching increases while the relatively high-frequency vibrations of the road wheels remains relatively weak. Therefore, the amplitude of the high-frequency component of the output of the ultra-sonic sensor 202 remains low. On the other hand, as vehicle body vibrations increase, the low-frequency component of the ultra-sonic sensor output increases. Therefore, the waveform of the output of the low-pass filter 204 becomes more pronounced as illustrated in FIG. 7(B). As a result, the output level of the AC-DC converter 208 jumps to a higher level as shown in FIG. 7(D). On the other hand, the output level of the AC-DC converter 210 remains low as shown in FIG. 7(E).

The amplitude of the low-frequency component of the ultra-sonic sensor varies according to the nature of the waviness of the road surface. For instance, when the peak-to-peak spacing of road features is much greater than their peak-to-trough vertical displacement, the vehicle body vibrations may be relatively weak. In this case, as the actual change in the sensor-to-road distance is relatively small, the amplitude of the low-frequency component of the ultra-sonic sensor 202 will remain relatively low. On the other hand, if the spacing of the road features is relatively short in relation of the peak-to-trough height, the vehicle body vibrations may become significant. In this case, the rate of change of the sensor-to-road distance per unit time become greater, resulting in a relatively high-amplitude low-frequency component of the ultra-sonic sensor signal.

Assuming that the road contours in the "UNDULANT" zone are sufficiently abrupt to cause vehicle rolling and pitching to an extent in excess of the HARD/SOFT criterion represented by the reference signal from the reference signal generator 216, the output of the comparator 212 will go HIGH. The controller 100 is responsive to the HIGH-level comparator output to produce a HIGH-level control signal and so operate the shock absorber in HARD mode.

At this time, since the logical value of the control signal is "1" (HIGH), the input level to the reference signal generator 218 via the inverter 224 becomes logical value "0". The diode $D_3$ thus becomes conductive to allow some of the current available at the junction 228 via the voltage divider of resistors $R_5$ and $R_6$ to drain through the resistor $R_7$. As a result, the output level of the reference signal generator 218 is lowered by a value BC, as shown in FIG. 9. At the same time, the diode $D_1$ in the reference signal generator 216 is also turned on by the LOW level input from the inverter 224. As a result, part of the current at the junction 222 is allowed to flow through the resistor $R_3$ and the diode $D_1$. Since the high-frequency component of the ultra-sonic sensor 202 is still at a low amplitude and thus the output level of the comparator 214 remains LOW, the potential applied to the junction 222 via the diode $D_2$ and the resistor $R_4$ remains nil. As a result, the output level of the reference signal generator 214 as a reference signal A is lowered by a value $\alpha_1C$, as shown in solid lines in FIG. 8.

When employing the HARD mode of operation of the shock absorber, relative displacement between the vehicle body and the road wheel is inhibited to a greater degree than in the SOFT mode of operation of the shock absorber. This causes a reduction of the amplitude of the ultra-sonic sensor signal $S_r$ in comparison with that obtaining in SOFT mode. This down-shift of the sensor level can be compensated for by lowering the reference signal level by a value corresponding to the reduction in the amplitude of the sensor signal level due to HARD mode operation.

In a zone labelled "ROUGH", small-scale irregularities in of the road surface increase in addition to the waviness of the road surface. As a result, the road wheels vibrate at relatively high frequencies and the vehicle body rolls and pitches due to the waviness of the road bed.

Both the high- and low-frequency components of the ultra-sonic sensor 202 are increased due to the overall roughness of the road surface. Since the low-frequency component of the ultra-sonic sensor output remains relatively strong, the output level of the comparator 212 and of the controller 100 remain HIGH, ordering continued HARD-mode operation of the shock absorber.

As set forth above, a HIGH-level control signal results in current drain via the diodes $D_1$ and $D_3$ of respective reference signal generators 216 and 218. In addition, the increase in the amplitude of the high-frequency component of the ultra-sonic sensor 202 means that the input level at the non-inverting input terminal of the comparator 218 increases, as shown in FIG. 7(E). When the input level at the non-inverting input terminal becomes greater than the reference signal level $B(=B_0-\beta C)$ of the reference signal generator 218, the output level of the comparator 214 goes HIGH. The HIGH-level comparator output is applied to the junction 222 of the reference signal generator 216 via the diode $D_2$ and the resistor $R_4$. Therefore, the reference signal level of the reference signal generator 216 increases by an amount $\alpha_2D$, to the level shown in broken line in FIG. 8. This increase in the reference signal level of the reference signal generator 216 applied to the comparator 212 prevents the road wheel vibrations from influencing recognition of the road surface waviness.

Figure 10:
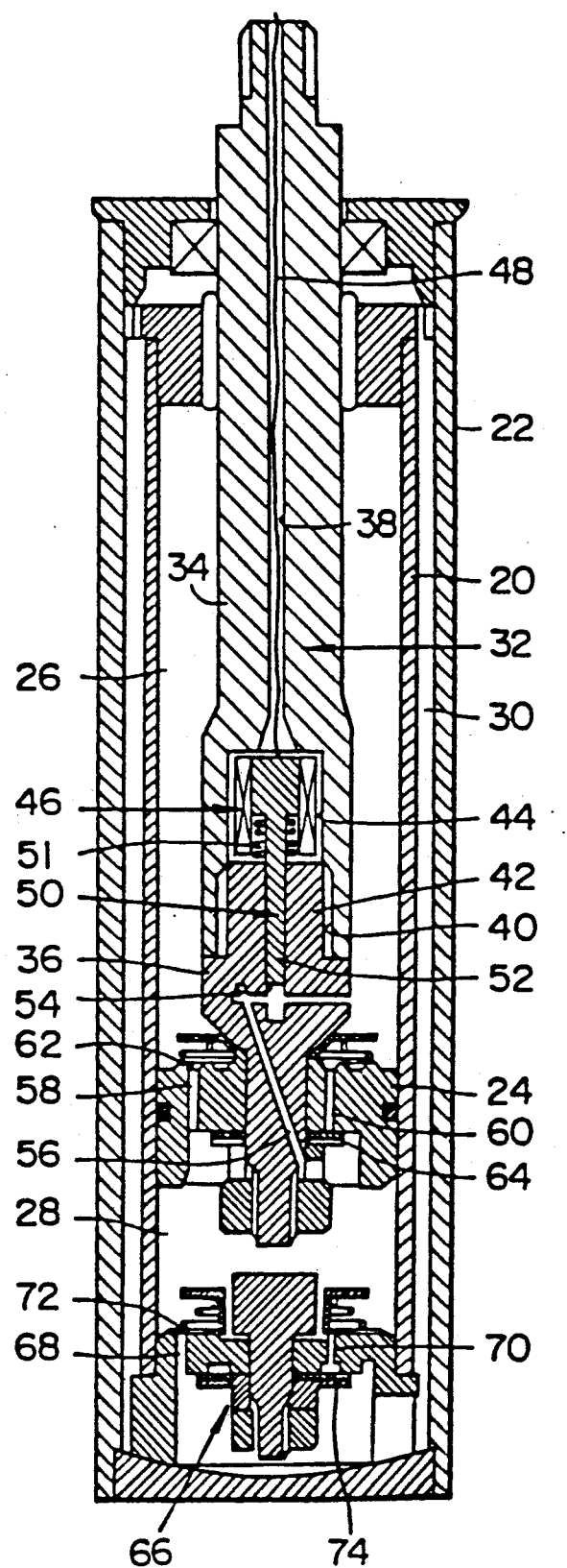
FIG. 10, a longitudinal section through a shock absorber used in the first preferred embodiment.
Figure 11:
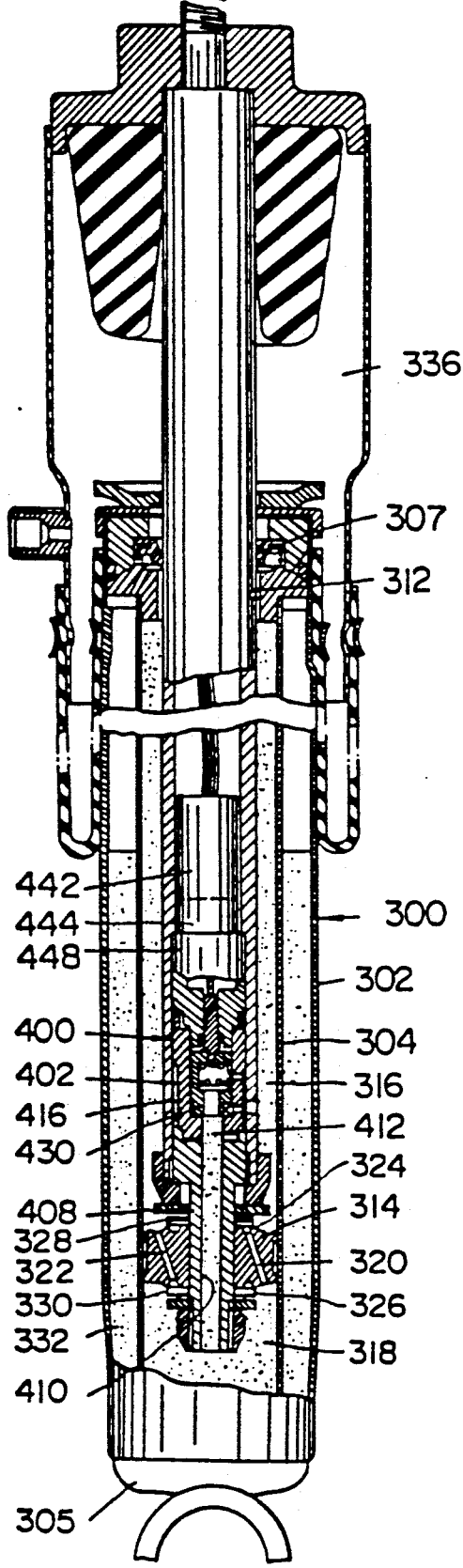
FIG. 11, a partial longitudinal section through a modified shock absorber.

FIG. 10 shows the detailed structure of a variable-damping-force shock absorber 12 employed in the first embodiment of the suspension control system according to the present invention. The shock absorber 12 generally comprises inner and outer hollow cylinders 20 and 22 arranged coaxially, and a piston 24 fitting flush within the hollow interior of the inner cylinder 20. The piston 24 defines upper and lower fluid chambers 26 and 28 within the inner cylinder 20. The inner and outer cylinders define an annular fluid reservoir chamber 30.

The piston 24 is connected to the vehicle body (not shown) by means of a piston rod which is generally referred to by the reference number 32. The piston rod 32 comprises upper and lower segments 34 and 36. The upper segment 34 is formed with an axially extending through opening 38. The lower end of the through opening 38 opens into a recess 40 defined on the lower end of the upper segment 34. On the other hand, the lower segment 36 has an upper section 42 engageable to the recess 40 to define therein a hollow space 44. An actuator is disposed within the space 44. The actuator 46 is connected to the driver circuit 16 through a lead 48 extending through the through opening 38. The actuator 46 is associated with a movable valve body 50 which has a lower end extension 52 inserted into a guide opening 54 defined in the lower segment 36. The guide opening 54 extends across a fluid passage 56 defined through the lower segment 36 for fluid communication between the upper and lower fluid chambers 26 and 28.

The fluid passage 56 serves as a bypass for flow-restrictive fluid passages 58 and 60 formed in the piston 24. The upper end of the fluid passage 58 is closed by a resilient flow-restricting valve 62. Similarly, the lower end of the fluid passage 60 is closed by a flow-restricting valve 64. The flow-restricting valves 62 and 64 serve as check valves for establishing one-way fluid communication in opposite directions. In addition, since the flow-restriction valves 62 and 64 are biased toward the ends of the fluid passages 58 and 60, they open to allow fluid communication between the upper and lower fluid chambers 26 and 28 only when the fluid pressure difference between the upper and lower chambers 26 and 28 overcomes the effective pressure of the valves.

The cross-sectional area of the fluid passages 58 and 60 and the set pressures of the fluid-restriction valves 60 and 62 determine the damping force produced in HIGH damping force mode. The cross-sectional area of the fluid passage 56 determines the drop in the damping force in the LOW damping force mode in comparison with that in the HIGH damping force mode.

The movable valve body 50 is normally biased upwards by means of a coil spring 51. As a result, when the actuator 46 is not energized, the lower end section 52 of the valve body 50 is separated from the fluid passage 56 to allow fluid communication between the upper and lower chamber. When the actuator 46 is energized, the valve body 50 moves downwards against the resilient force of the coil spring 51 to block the fluid passage 56 with the lower end extension 52. As a result, fluid communication between the upper and lower fluid chambers 26 and 28 via the fluid passage 56 is blocked. When fluid communication through the fluid passage is permitted, the damping force produced by the shock absorber 14 remains LOW. On the other hand, when the fluid passage 56 is shut, fluid flow rate is reduced, thus increasing the damping force produced. Therefore, when the valve body 50 is shifted to the lowered position, the shock absorber works in HIGH damping force mode to produce a higher damping force against vertical shocks.

A bottom valve 66 is installed between the lower fluid chamber 28 and the fluid reservoir chamber 30. The bottom valve 66 is secured to the lower end of the inner cylinder and includes fluid passages 68 and 70. The upper end of the fluid passage 68 is closed by a flow-restriction valve 72. The lower end of the fluid passage 70 is closed by a flow-restriction valve 74.

In the normal state wherein the control signal of the controller 100 remains LOW, the movable valve body 50 is held in its upper position by the effect of the spring force 51 so that the lower end extension 52 does not project into the fluid passage 56. Therefore, the fluid communication is established through both the fluid passage 56 and the applicable one of the flow-restricting fluid passages 58 and 60. As a result, the total flow restriction is relatively weak to allow the shock absorber to operate in SOFT mode.

In response to a HIGH-level control signal from the controller 100, the driver signal generator 102 corresponding to each shock absorber 12 becomes active to energize the actuator 46. The actuator 46 drives the movable valve body 50 downward. This downward movement shifts the lower end of the extension 52 of the valve body 50 into the fluid passage 56 so as to block fluid communication between the upper and lower fluid chambers 26 and 28 via the fluid passage 56. Therefore, the fluid can flow between the upper and lower chambers 26 and 28 only through one of the fluid passages 58 and 60. The fluid flow restriction is, thus, increased, resulting in a greater damping force than is produced in the SOFT mode. In other words, the shock absorber 12 operates in HARD mode.

FIGS. 11 to 14 show a modified form of the variable-damping-characteristic shock absorber of FIG. 10. In this modification, the shock absorber 12 can be operated in any of three modes, namely HARD mode, SOFT mode and MEDIUM mode, in the last of which damping characteristics intermediate to those of HARD mode and SOFT mode are achieved.

The hydraulic shock absorber 12 has coaxial inner and outer cylinders 302 and 304. Top and bottom ends of the cylinders 302 and 304 are plugged with fittings 306 and 305. The fitting 306 includes a seal 307 which establishes a liquid-tight seal. A piston rod 308 extends through an opening 312 formed in the fitting 306 and is rigidly connected to a vehicle body (not shown) at its top end. The piston rod 308 is, in turn, connected to a piston 314 reciprocally housed within the inner cylinder 302 and defining upper and lower fluid chambers 316 and 318 therein.

The piston 314 has fluid passages 320 and 322 connecting the upper and lower fluid chambers 316 and 318. The piston 214 also has annular grooves 324 and 326 along its upper and lower surfaces concentric about its axis. The upper end of the fluid passage 320 opens into the groove 324. On the other hand, the lower end of the fluid passage 322 opens into the groove 326. Upper and lower check valves 328 and 330 are provided opposite the grooves 324 and 326 respectively to close the grooves when in their closed positions. The lower end of the fluid passage 320 opens onto the lower surface of the piston at a point outside of the check valve 330. Likewise the upper end of the fluid passage 322 opens onto the upper surface of the piston at a point outside of the check valve 328.

Therefore, the fluid passage 322 is active during the piston expansion stroke, i.e. during rebound of the shock absorber. At this time, the check valve 328 prevents fluid flow through the fluid passage 320. On the other hand, during the piston compression stroke, i.e. during bounding movement of the suspension, the fluid passage 320 is active, allowing fluid flow from the lower fluid chamber 318 to the upper fluid chamber 316 and the fluid passage 322 is blocked by the check valve 330.

The piston rod 308 has a hollow cylindrical shape so that a damping force adjusting mechanism, which will be referred to generally by the reference numeral "400" hereafter, can be housed therein. The damping force adjusting mechanism 400 includes a valve mechanism 402 for adjusting the cross-sectional area through which the working fluid can flow between the upper and lower chambers. In the preferred embodiment, the valve mechanism 402 allows three steps of variation of the damping force, i.e., HARD mode, MEDIUM mode and SOFT mode, the narrowest cross-sectional area representing the HARD mode, the widest the SOFT mode and intermediate the MEDIUM mode. Although the preferred embodiment of the invention will be described hereafter in terms of a three-way, adjustable-damping-force shock absorber, the number of adjustable positions of the shock absorber may be increased or decreased as desired and is not limited to this example.

Figure 12:
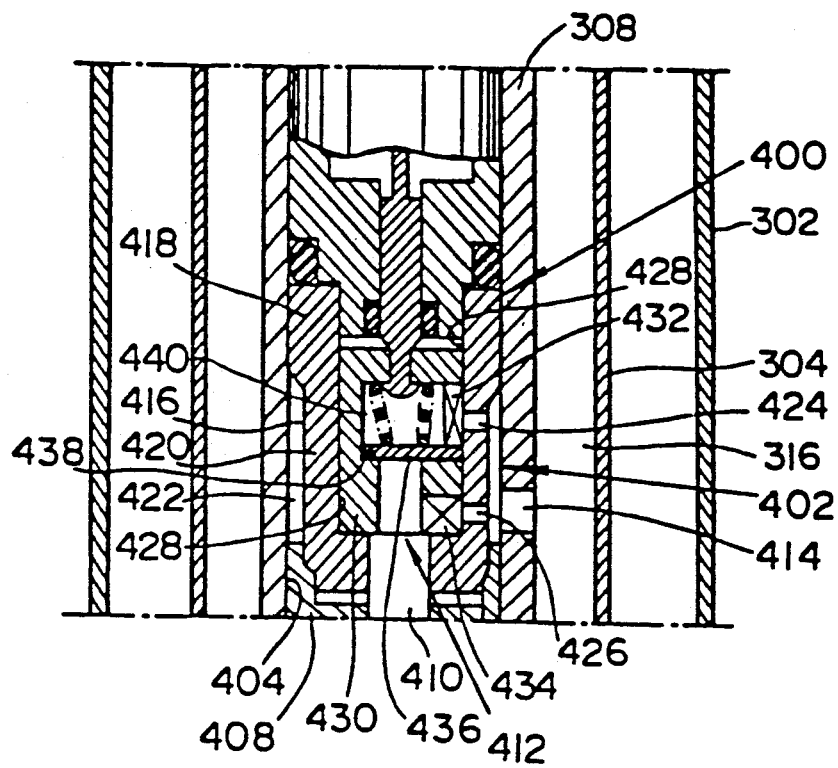
FIG. 12, an enlarged longitudinal section through the damping force adjusting mechanism of FIG. 11.

As shown in FIG. 12, the piston rod 308 defines an axially extending through opening 404 with the lower end opening into the lower fluid chamber 318. A fitting 408 seals the lower end of the opening 404 of the piston rod and has axially extending through opening 410, the axis of which is parallel to the axis of the through opening 404 of the piston rod. Thus, the through openings 404 and 410 constitute a fluid path 412 extending through the piston rod. The piston rod 308 also has one or more radially extending orifices or openings 414 opening into the upper fluid chamber 316. Thus, the upper and lower fluid chambers 316 and 318 are in communication through the fluid path 412 and the radial orifices 414.

A stationary valve member 416 with a flaring upper end 418 is inserted into the through opening 404 of the piston rod. The outer periphery of the flaring end 418 of the stationary valve member 416 is in sealing contact with the internal periphery of the through opening. The stationary valve member 416 has a portion 420 with a smaller diameter than that of the upper end 418 and so as to define an annular chamber 422 in conjunction with the inner periphery of the through opening 404 of the piston rod. The stationary valve member 416 has two sets of radially extending orifices 424 and 426 and an internal space 428. The radially extending orifices 424 and 426 establish communication between the internal space 428 and the annular chamber 422. A movable or rotary valve member 430 is disposed within the internal space 428 of the stationary valve member 416. The outer periphery of the rotary valve member 430 slidingly and sealingly contacts the inner surface of the stationary valve member 416 to establish a liquid-tight seal therebetween. Radially extending orifices 432 and 434 are defined in the rotary valve member 430 at positions opposite the orifices 424 and 426 of the stationary valve member 416.

Figure 13A:
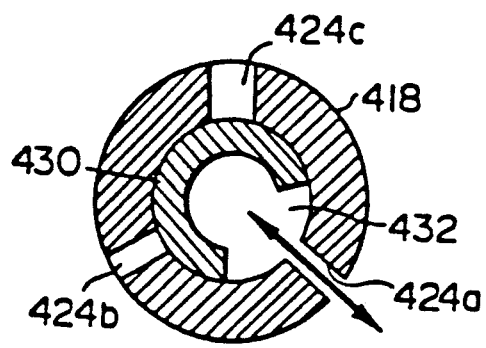
FIG. 13(A) and (B), cross-sections through the mechanism shown in FIG. 12 at positions revealing the three possible fluid flow paths.
Figure 13B:
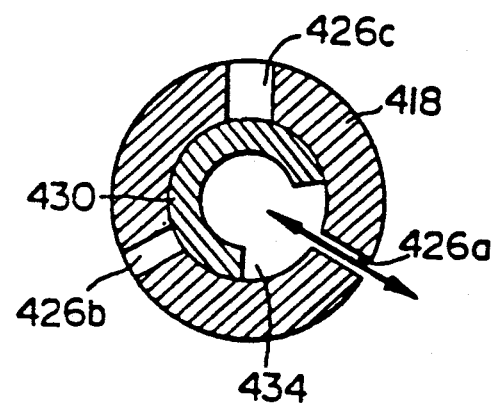

As shown in FIGS. 13(A) and 13(B), the orifices 424 and 426 respectively include first, second and third orifices 424a, 424b, 424c, and 426a, 426b, and 426c. The first orifices 424a and 426a have the narrowest cross-sections and the orifices 432 and 434 are adapted to be in alignment with the first orifices to establish fluid communication between the upper and lower fluid chambers 316 and 318 in the case of the HARD mode. The third orifices 424c and 426c have the widest cross-sections and the orifices 432 and 434 are adapted to be in alignment with the third orifices in the case of the SOFT mode. The cross-sections of the second orifices 424b and 426c are intermediate those of the first and third orifices and the orifices 432 and 434 are adapted to align therewith in the case of the MEDIUM mode.

A check valve 436 is provided within an internal space of the rotary valve member 430. The check valve 436 is normally biased towards a valve seat 438 by means of a bias spring 440 for allowing one-way fluid flow from the lower fluid chamber to the upper fluid chamber. This cause the bound damping force to be somewhat weaker than the rebound damping force.

Figure 14:
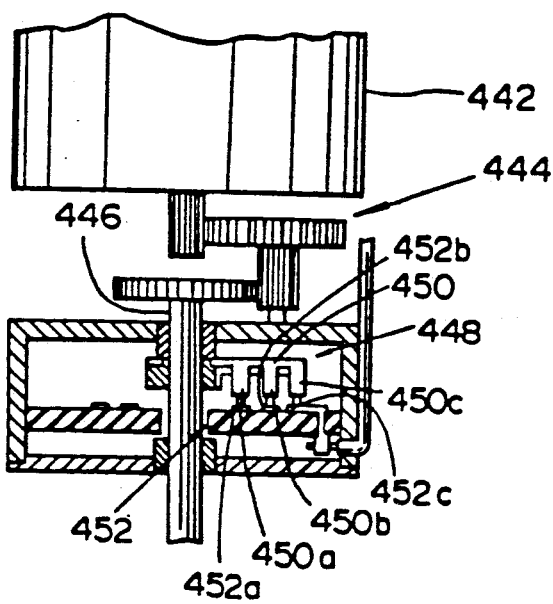
FIG. 14, an enlarged elevation in partial section of actuating elements of the mechanism shown in FIG. 12.

The rotary valve member 430 is associated with an electrically operable actuator such as an electrical step motor 442 through a differential gear unit 444 and an output shaft 446 as shown in FIG. 14. A potentiometer 448 is associated with the output shaft 446. The potentiometer 448 includes a movable contact 450 with contactors 450a, 450b and 450c. The contactors 450a, 450b and 450c are adapted to slidingly contact stationary contact elements 452a, 452b and 452c of a stationary contact 452. According to the electrical connections between the movable contact and the stationary contact, the potentiometer 448 produces a mode signal representative of the rotary valve position and thus indicative of the selected mode of the damping force adjusting mechanism. The step motor 442 is electrically connected to a controller 100 to receive the control signal as a mode selector signal which drive the motor 442 through an angle corresponding to the rotary valve movement to the corresponding valve position. In this case, the potentiometer will return the mode signal as a feedback signal to indicate the instantaneous valve position.

It should be appreciated that the controller 100 may be operated either in automatic mode or in manual mode.

Returning to FIG. 11, the shock absorber has a fluid reservoir chamber 332 between its inner and outer cylinders 302 and 304, which fluid reservoir chamber 332 is in communication with the lower fluid chamber 318 via the bottom fitting 305 described previously. The bottom fitting 305 may serve to produce damping force in cooperation with the piston and the damping force adjusting mechanism during bounding and rebounding motion of the vehicle. A relatively low pressure pneumatic chamber 336 is also defined between the inner and outer cylinders 302 and 304.

The operation of the damping force adjusting mechanism 400 will be briefly described herebelow with reference to FIGS. 13. FIGS. 13(A) and 13(B) show the case of the HARD mode. In this case, the orifice 432 of the rotary valve 430 is in alignment with the orifice 424a and the orifice 434 is in alignment with the orifice 426a During vehicle rebounding motion, i.e., in the piston compression stroke, the fluid flows from the upper fluid chamber 316 to the lower fluid chamber 318 though the orifice 426a. On the other hand, during vehicle bounding motion, the fluid flows from the lower fluid chamber 318 to the upper fluid chamber 316 through orifices 424a and 426a. Since the first orifices 424a and 426a are the narrowest, the damping force produced in this mode is the highest among the three selectable modes.

In case of the MEDIUM mode, the orifices 432 and 434 of the rotary valve member 430 are respectively in alignment with the second orifices 424b and 426b.

In case of the SOFT mode, the orifices 432 and 434 align with the third orifices 424c and 426c, respectively to cause fluid flow. Since the third orifices 424c and 426c are the widest of the three sets, as described above, the damping force created in this SOFT mode is the lowest.

According to the shown embodiment, the electric step motor 442 is connected to the controller 100 through the driver circuit 16. Similarly to the case of the two-way shock absorber, the controller 100 selects any appropriate damping force state in accordance with detected road surface conditions but in this case produces a three-way control signal for actuating the shock absorber to one of the SOFT, MEDIUM and HARD modes. The driver circuit 16 is responsive to the control signal to drive the step motor 442 to operate the rotary valve member 430 to the corresponding valve position.

As an alternative in the modification set forth above, only SOFT and MEDIUM modes may be used for road-condition-dependent suspension control. Therefore, when the HARD mode is selected in the foregoing first embodiment set forth above the controller 100 actuates the shock absorber to MEDIUM mode.

Figure 16:
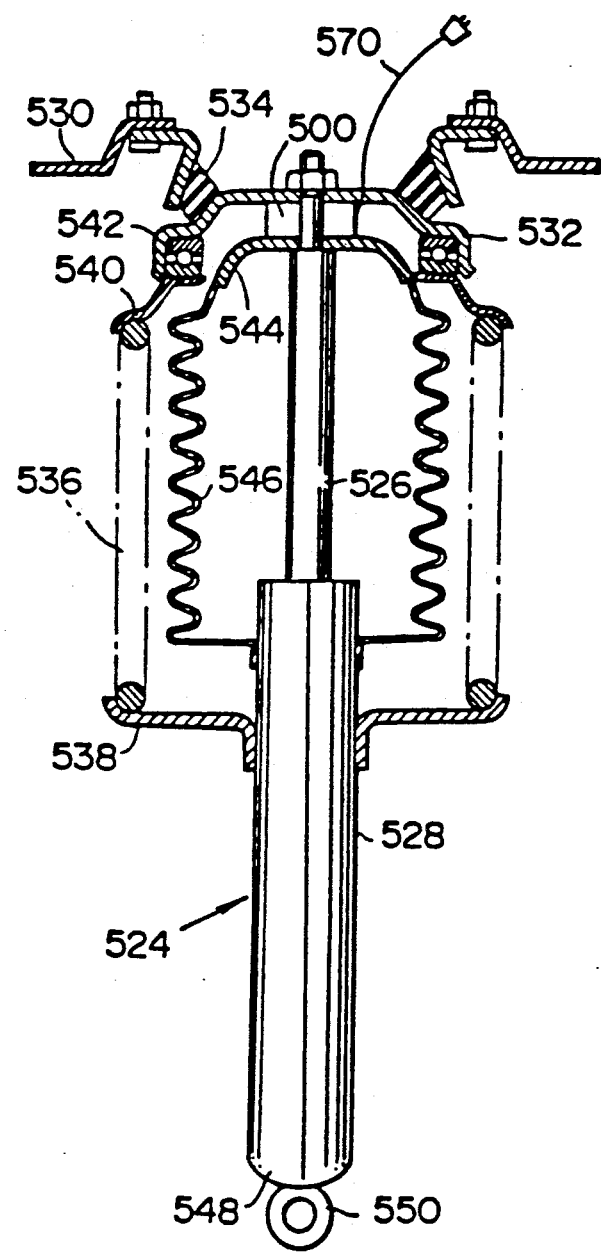
FIG. 16, an elevation of a strut assembly for use with the second preferred embodiment.
Figure 17:
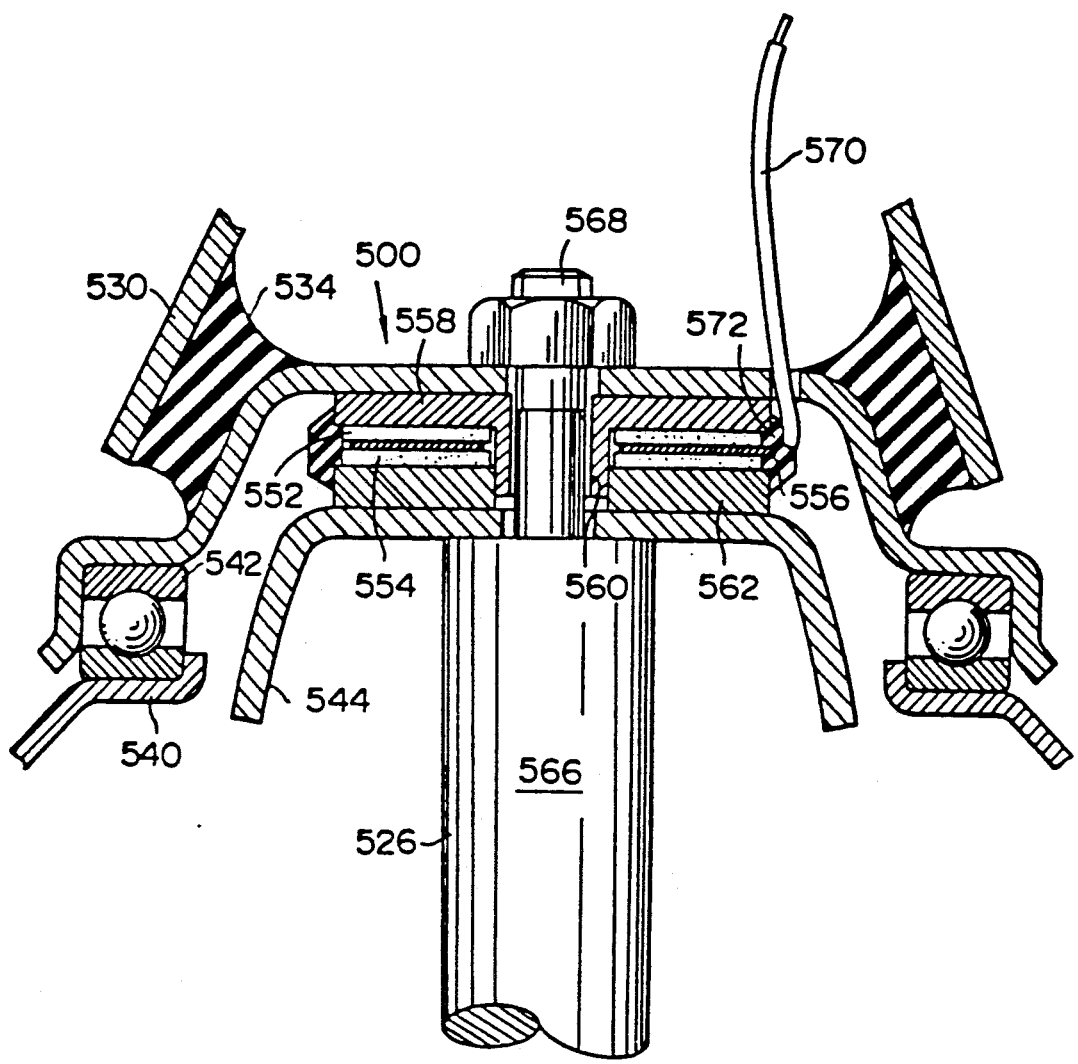
FIG. 17, an enlarged elevation of part of the strut assembly of FIG. 16.

FIGS. 15 to 17 show a second embodiment of the suspension control system according to the present invention. This second embodiment also employs the variable damping force shock absorber identical to that disclosed with respect to the first embodiment of the invention. On the other hand, this embodiment employs a vibration sensor for detecting the relative displacement between the vehicle body and the road wheel axle, instead of the ultra-sonic sensor employed in the first embodiment.

The vibration sensor 500 is associated with a shock absorber in order to monitor axial displacement of the piston rod thereof. The vibration sensor 500 produces an AC vibration sensor signal with a value representative of the relative displacement between the vehicle body and the road wheel axle. The vibration sensor signal is fed to a high-frequency filter circuit 502 and a low-frequency filter circuit 504. The high-frequency filter circuit 502 is adapted to remove the high-frequency components from the vibration sensor signal and pass only the low-frequency components thereof. The high-frequency filter circuit 502 outputs a direct-current signal representative of the magnitude of vibration of the vehicle body, which signal will be referred to hereafter as "low-frequency component indicative signal". The low-frequency filter circuit 504 is adapted to remove the low-frequency components from the vibration sensor signal and pass only the high-frequency components thereof. The low-frequency filter circuit 504 produces a direct-current signal representative of the magnitude of high-frequency vibrations of the road wheel axle, which signal will be referred to hereafter as "high-frequency component indicative signal".

The low-frequency component indicative signal from the high-frequency filter circuit 502 is input to a comparator 506 through its non-inverting input terminal. Similarly, the high-frequency component indicative signal of the high-frequency component filter circuit 504 is input to a comparator 508 through its non-inverting input terminal. Each of the comparators 506 and 508 has inverting input terminals connected to a corresponding reference signal generator 510 or 512. On the other hand, the comparator 506 has the output terminal connected to a controller 514 which is substantially the same as set forth with respect to FIG. 4 and produces a control signal to operate the shock absorber between HARD and SOFT modes. The output terminal of the comparator 508 is connected to the reference signal generator 510.

The reference signal generator 510 has a voltage divider 516 including resistors $R_{10}$ and $R_{11}$ which generates a predetermined voltage at the junction between the resistors. Through the junction 518, the reference signal generator 510 is connected to the inverting input terminal of the comparator 506. The junction 518 is also connected to the controller 514 via a diode $D_{10}$ and a resistor $R_{12}$ to receive therefrom the control signal. Also, the junction 518 is connected to the output terminal of the comparator 506 via a diode $D_{11}$ and a resistor $R_{13}$. On the other hand, the reference signal generator 512 has a voltage divider 520 including resistors $R_{14}$ and $R_{15}$ with a junction 522 therebetween. The junction 522 is connected to the controller 514 through a diode $D_{12}$ and a resistor $R_{16}$.

In comparison with the circuitry of the first embodiment of suspension control system, the inverter is omitted and the polarity of the diodes between the junctions and the controller is reversed. This is due to the fact that, since the sensitivity of the vibration sensor is boosted by the greater damping force produced in the HARD mode of shock absorber operation, compensating by increasing the reference value is necessary achieved for uniform detection of the HARD suspension criterion.

Figure 20:
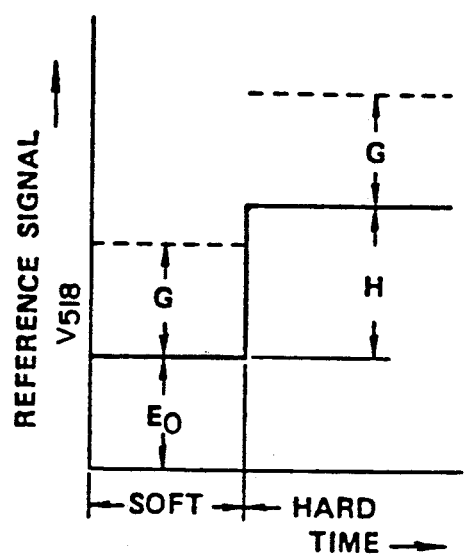
FIG. 20, a diagram of the possible states of a low-frequency reference signal.
Figure 21:
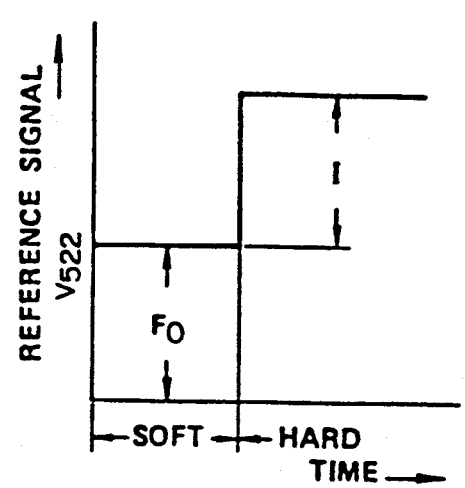
FIG. 21, a diagram of the possible states of a high-frequency reference signal.

FIGS. 20 and 21 illustrate the behavior of the reference signals at the junctions 518 and 522 respectively in response to extremes of road surface condition. When the road is relatively smooth, the comparators 506, 508 and the controller 514 all output low-level signal due to the relatively low-amplitude sensor inputs. Thus, since neither reference signal generator 510, 512 receives a boost from the controller, and the generator 510 similarly is not boosted by the comparator 508 via diode $D_{11}$, the divider voltages $E_o$, $F_o$ are applied without modification to the inverting input terminals of the corresponding comparators 506, 508.

If the road surface becomes noticeably bumpier, the comparators 506, 508 output HIGH-level signals. Thus, the first reference generator 510 may receive one boost G from the comparator 508, but certainly receives a boost H from the controller 514. The second reference generator 512 receives a single boost I from the controller 514. The boost G is applied to the reference voltage at junction 518 when high-frequency wheel vibrations are detected and the comparator outputs a HIGH-level signal.

FIGS. 16 shows a suspension strut assembly employed in the second embodiment of suspension control system according to the present invention, of FIG. 15. The strut assembly includes a shock absorber 524 having variable damping characteristics and operable in either HARD or SOFT mode. A piston rod 526 extends from the shock absorber cylinder 528 and is connected to a strut housing 530 of the vehicle body through a mounting bracket 532. A rubber insulator 534 is interpositioned between the mounting bracket 532 and the strut housing 530 for absorbing vibrations transmitted between the vehicle body and the shock absorber.

A suspension coil spring 536 is wound around the piston rod 526 of the shock absorber. The lower end of the suspension coil spring 536 seats on a lower spring seat 538 fixed to the outer periphery of the outer shock absorber cylinder. On the other hand, the upper end of the suspension coil spring 536 seats on an upper spring seat 540 which is connected to the mounting bracket 532 via a bearing assembly 542. The bearing assembly 542 allows the strut assembly to pivot freely about the piston rod 526. The upper spring seat 540 is rigidly secured to a dust insulator cover 544, to which the upper end of elastically deformable rubber dust insulator 546 is secured. The lower end of the dust insulator 546 is secured to the outer periphery of the outer cylinder of the shock absorber.

A closure 548 with a connecting ring 550 is fitted to the bottom of the shock absorber cylinder. The shock absorber cylinder is connected to a suspension arm (not shown) via the connecting ring.

The vibration sensor 500 is inserted between the mounting bracket 532 and the strut housing 530. As shown in FIG. 17, the vibration sensor 500 has a pair of piezoelectric elements 552 and 554 sandwiching a terminal plate 556. The piezoelectric element 552 is fixed to a disc plate 558 with an axially extending cylindrical section 560. The disc plate 558 is fixed to the mounting bracket 532 for motion therewith. On the other hand, the piezoelectric element 554 is secured to a disc plate 562 which is, conversely, fixed to the cover plate 544 which is fixedly mounted on a step 564 formed between the shaft 566 and the threaded end 568 of the piston rod.

The cylindrical section 560 surrounds the threaded section 568 of the piston rod.

A lead wire 570 extends from the terminal plate 556 through a rubber seal 572. The lead wire 570 is connected to the high-frequency filter circuit 502 and the low-frequency filter circuit 504. The output of the vibration sensor 500, i.e., the vibration sensor signal, is thus fed to the filter circuits 502 and 504 via the terminal plate 556 and the lead wire 570.

The vibration sensor 500 constructed as above is not responsive to the static load applied to the vehicle, which generally causes a lowering of the vehicle level, such as passengers and/or luggage. The vibration sensor 500 is thus responsive only to dynamic loads due to vertical displacements and forces applied to the road wheel and vehicle body. The vibration sensor signal is thus indicative solely of the dynamic load applied to the vibration sensor 500.

Figure 18:
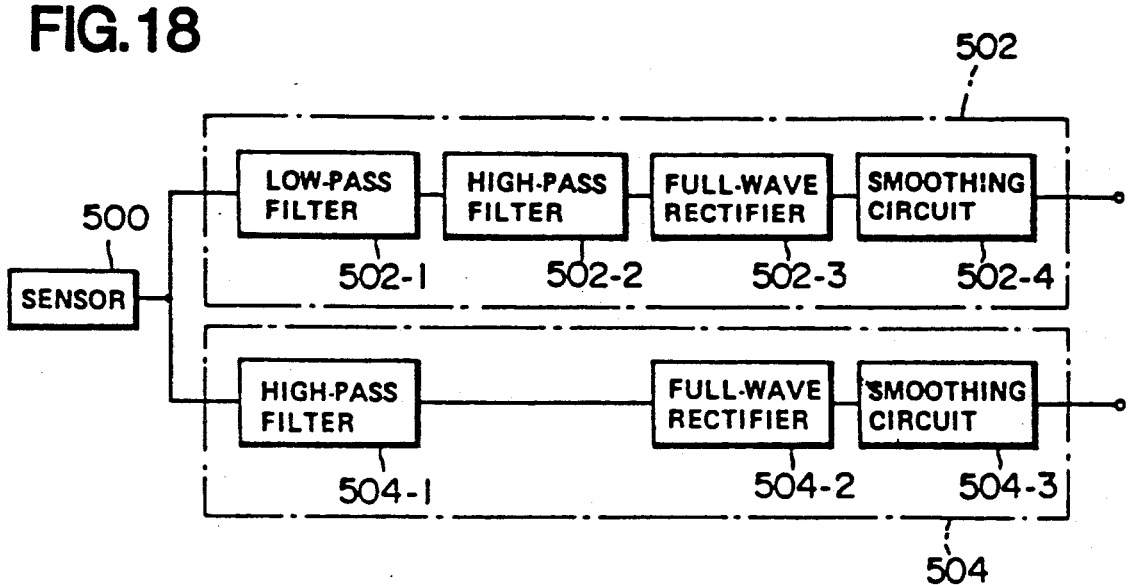
FIG. 18, a block diagram of a modification to the circuit of FIG. 15.

As shown in FIG. 18, the high-frequency filter circuit 502 may alternatively comprise a low-pass filter 502-1, a high-pass filter component 502-2, a full-wave rectifier 502-3 and a smoothing circuit 502-4. The low-pass filter is adapted to remove high-frequency components from the vibration sensor signal and pass only the low-frequency components. In the preferred embodiment, the low-pass filter 502-1 removes signal component at frequencies above 3 to 5 Hz so as to resolve signal components in the range of 1 to 2 Hz. The high-pass filter 502-2 is adapted to remove very-low-frequency components from the output of the low-pass filter for the sake of noise suppression. In practice, the high-pass filter 502-2 is intended to remove frequency components below 0.2 to 0.3 Hz. Similarly, the low-frequency filter circuit 504 comprises a high-pass filter 504-1, a full-wave rectifier 504-2 and a smoothing circuit 504-3. The high-pass filter is, in practice, designed to filter out signal components at frequencies below 3 to 5 Hz so as to pick signal components in the frequency range of 12 to 13 Hz.

The operation of the aforementioned high-frequency filter circuit 502 and the low-frequency filter circuit 504 will be described with reference to FIG. 19.

As shown in FIG. 19, the vibration sensor signal (A) is filtered by the low-pass filter 502-1 and the high-pass filter 504-1, as illustrated in (F) and (B). The low-frequency component of FIG. 19(F) passes through the high-pass filter 502-2, leaving only the signal components in the frequency range of 1 to 2 Hz. The output (G) of the high-pass filter is rectified by the full-wave rectifier 502-3 into the waveform of FIG. 19(H). The output of the full-wave rectifier 502-3 is smoothed by the smoothing circuit 502-4 into the waveform of FIG. 19(I).

Figure 19A:
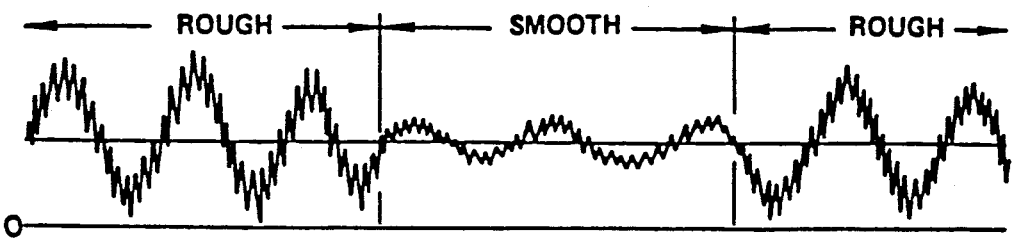
FIGS. 19(A)–19(J) illustrates a timing chart for typical signals obtaining in the circuit of FIG. 18.
Figure 19B:
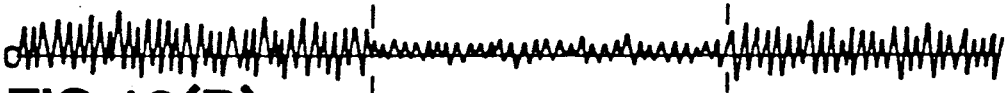
Figure 19C:
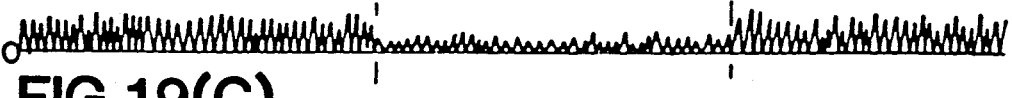
Figure 19D:
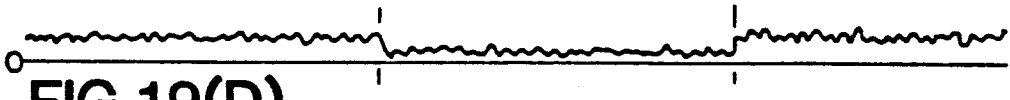
Figure 19E:
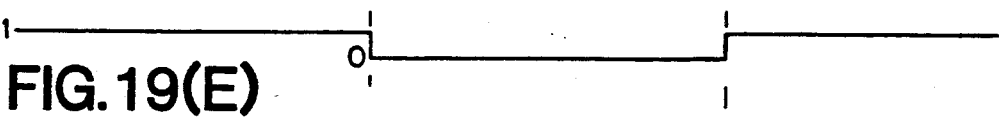
Figure 19F:
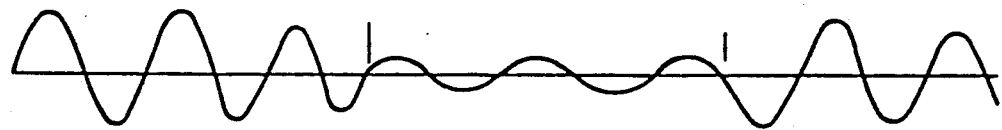
Figure 19G:
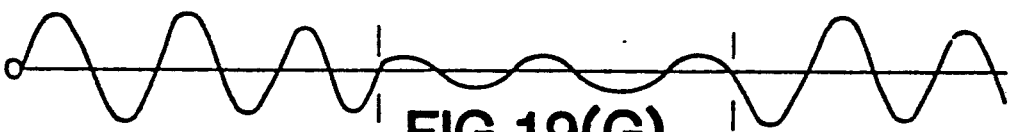
Figure 19H:
Figure 19I:
Figure 19J:

On the other hand, the output of the high-pass filter 504-1 of FIG. 19(B) is rectified by the full-wave rectifier 504-2 into the waveform of FIG. 19(C). The rectifier output is smoothed by the smoothing circuit 504-3 into the waveform of FIG. 19(D).

The smoothed signals, respectively representative of the amplitudes of the low-frequency component and the high-frequency component of the vibration sensor signal, are respectively fed to the corresponding comparators 506 and 508.

In the foregoing second embodiment of FIG. 15, only the output of the comparator 506 is input to the controller as a road-surface-condition-indicative signal. However, it would be possible to apply both of the comparator outputs to the controller so that the controller can fully recognize the road surface conditions from the combination of the comparator outputs. In this case, the road surface conditions can be analyzed according to the following table:

| Road Condition | 506 OUTPUT | 508 OUTPUT |
| --- | --- | --- |
| ROUGH ROAD | HIGH | HIGH |
| POORLY SURFACED ROAD | LOW | HIGH |
| UNDULANT ROAD | HIGH | LOW |
| SMOOTH ROAD | LOW | LOW |

In the practical suspension control performed by the controller 100, the recognized road surface condition can be used in substantially the same manner as that disclosed with respect to the first embodiment.

Figure 22:
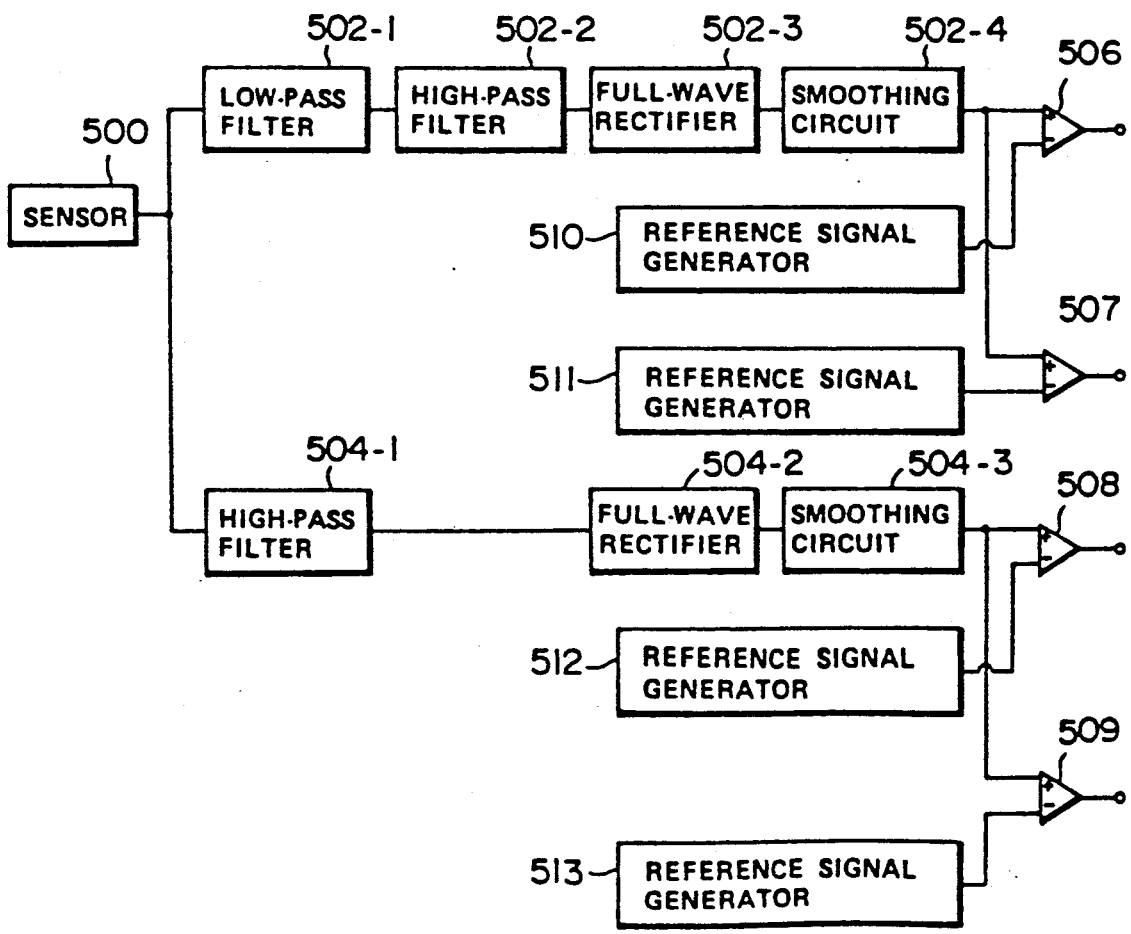
FIG. 22, a block diagram of another modification to the circuit of FIG. 15.

FIG. 22 shows a modification to the road sensor in the second embodiment of suspension control system according to the invention. In this modification, comparators 507 and 509 are added. The comparator 507 is connected in parallel with the comparator 506 and its non-inverting input terminal is connected for input from the smoothing circuit 502-4. The inverting input terminal of the comparator 507 is connected to a reference signal generator 511. On the other hand, the comparator 509 is connected in parallel with the comparator 508 and connected to the smoothing circuit 504-3 at its non-inverting input terminal. The inverting input terminal of the comparator 509 is connected to a reference-signal generator 513. The reference signal generator 511 is adapted to produce a reference signal having a value smaller than the reference signal produced by the reference signal generator 510. Similarly, the reference signal generator 513 is adapted to produce a reference signal having a value smaller than that of the reference signal of the reference signal generator 512. With this arrangement, the magnitude of vibration of the road wheel and of the vehicle body can be more precisely detected than in the system shown in FIG. 15.

The vibration magnitude of the road wheel and vehicle body can be resolved according to the following table:

| Vibration Magnitude of Vehicle Body | 506 OUTPUT | 507 OUTPUT |
| --- | --- | --- |
| STRONG | HIGH | HIGH |
| INTERMEDIATE | LOW | HIGH |
| WEAK | LOW | LOW |

| Vibration Magnitude of Road Wheel | 508 OUTPUT | 509 OUTPUT |
| --- | --- | --- |
| STRONG | HIGH | HIGH |
| INTERMEDIATE | LOW | HIGH |
| WEAK | LOW | LOW |

From the foregoing tables, road surface conditions may be more precisely detected than in the previously described systems according to the following table:

| Road Condition | Vibration Magnitude Vehicle Body | Vibration Magnitude Road Wheel |
| --- | --- | --- |
| SMOOTH ROAD | SMALL | SMALL |
| TEXTURED ROAD | SMALL | INTERMEDIATE |
| GRAVEL ROAD | INTERMEDIATE | BIG |
| ROUGH ROAD | BIG | BIG |
| STONE PAVING OR THE LIKE | BIG | INTERMEDIATE |
| BUMP | BIG | SMALL |

Given more precise resolution of the road surface conditions, more precise suspension control can be performed in order to fit the hardness of the shock absorber in close correspondence to actual road surface conditions.

Figure 23:
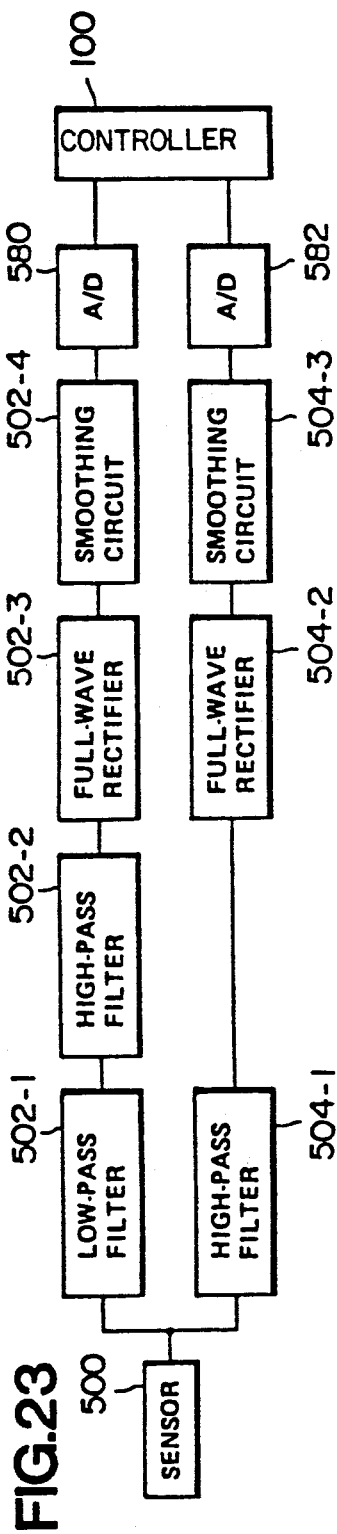
FIG. 23, a block diagram of yet another modification to the circuit of FIG. 15.

FIG. 23 shows another modification of the second embodiment of the suspension control system of FIG. 15. In this modification, analog-to-digital converters (A/D converters) 580 and 582 are connected for input from the smoothing circuits 502-4 and 504-3. The A/D converters convert the analog smoothing circuit outputs into binary values representative of the amplitude of the smoothing circuit outputs for direct application to the digital controller 100.

Although the second embodiment has been illustrated as employing a vibration sensor to detect relative displacement between the vehicle body and the road wheel, this may be replaced by a well-known vehicle body height sensor, accelerometer, strain gauge or the like.

Figure 24:
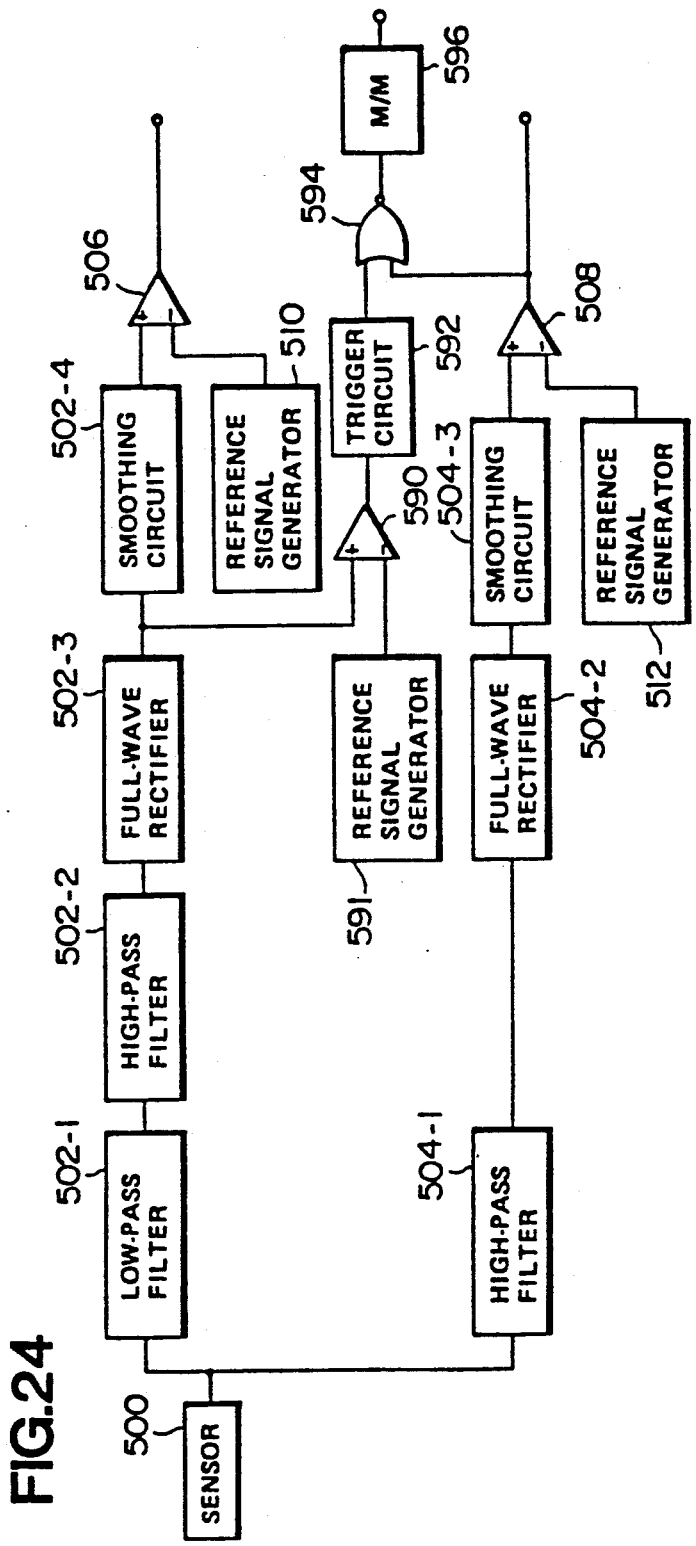
FIG. 24, a block diagram of still another modification to the circuit of FIG. 15.

FIG. 24 shows a further modification to the second embodiment of the suspension control system according to the present invention. In this modification, a comparator 590 is connected to the full-wave rectifier 502-3 to receive the rectified signal through its non-inverting input terminal. The inverting input terminal of the comparator 590 is connected to a reference signal generator 591. The reference signal generator 591 produces a reference signal having a value representative of the hard-suspension criterion, e.g. vibrations due to the vehicle passing over a bump or depression on the road surface. The output terminal of the comparator 590 is connected to a trigger circuit 592 which is adapted to output a LOW-level pulse for a given period of time, e.g. 10 ms, in response to the rising edge of a HIGH-level comparator output. The trigger circuit 592 is connected for output to a NOR gate 594 which also receives an input from the low-frequency filter circuit 504. The output terminal of the NOR gate is connected to a retriggerable monostable multivibrator 596.

The NOR gate 594 outputs a HIGH-level signal when the trigger signal from the trigger circuit 592 is HIGH and the input from the filter circuit 504 remains LOW. The HIGH-level output of the NOR gate triggers the monostable multivibrator 596 to make the latter output a LOW-level signal for a given period of time. The controller 100 receives the output of the monostable multivibrator 596 and issues a HIGH-level control signal to switch the shock absorber into HARD mode for the period of time for which the monostable multivibrator output remains LOW.

With this arrangement, the suspension control system temporarily hardens the shock absorber as the vehicle passes over a bump or a depression on the road surface and exhibits good response characteristics.

Figure 25:
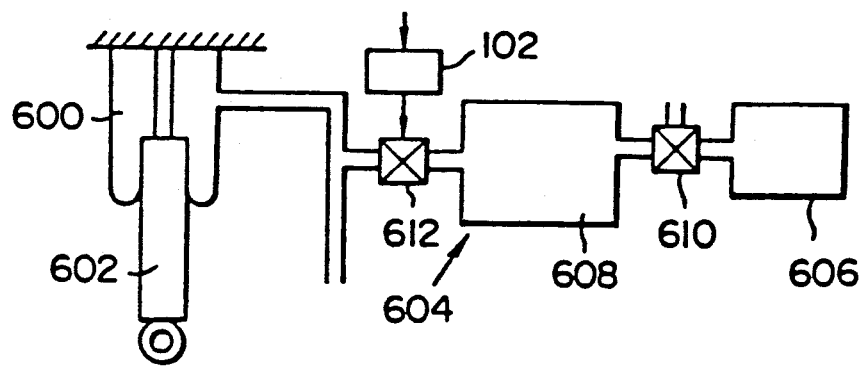
FIG. 25, a diagram of a third embodiment of a suspension control system.

FIG. 25 shows the third embodiment of the suspension control system in accordance with the present invention. In this embodiment, a known vehicle height control system is used for hardness control of the suspension. Such vehicle height control 4,349,077 to Sekiguchi et al, U.S. Pat. No. 4,327,936 to Sekiguchi systems have been disclosed in U.S. Patent and European Patent First Publication No. 0 114 700, published on Aug. 1, 1984, for example. Detailed constructions of the suspension system with vehicle height control as disclosed in the above-referenced publications are hereby incorporated by reference for the sake of disclosure.

In the shown system, an expandable and contractable pneumatic chamber 600 is formed above the shock absorber 602. The pneumatic chamber 600 is connected to a pressurized pneumatic fluid source 604. The fluid source 604 comprises a compressor 606 for pressurizing a fluid such as air, a reservoir tank 608 connected to the compressor 606 through an induction valve 610, and a pressure control valve 612. The pressure control valve 612 and the induction valve 610 are connected to the driver signal generator 102 to be controlled thereby.

According to the shown embodiment, the driver circuit 102 is connected to the controller 100. When energized by the driver signal, pressure control valve 612 closes to block pneumatic fluid communication between the pneumatic chamber 600 and the fluid reservoir 608. As a result, the effective volume of the pneumatic chamber 600 is precisely that of the pneumatic chamber itself. Since the damping characteristics due to the pneumatic pressure in the pneumatic chamber is related to the effective volume of the pneumatic chamber and a smaller effective volume is achieved by blocking fluid communication between the pneumatic chamber and the fluid reservoir, the pneumatic chamber becomes relatively rigid in this case, providing a larger damping force in response to vehicle body-chassis displacement.

On the other hand, in the normal valve position, the pressure control valve 612 opens to allow fluid communication between the pneumatic chamber and the fluid reservoir. As a result, the effective volume becomes equal to the sum of the volumes of the pneumatic chamber and the fluid reservoir. By providing a larger effective volume, the damping characteristics of the pneumatic chamber are weakened.

As set forth above, according to the present invention, the vehicular suspension system can provide both riding comfort and good drivability by controlling hardness of the suspension depending upon the road surface conditions.

It should be noted that although the shown embodiments control the damping force and/or rigidity of the suspension system by adjusting the damping characteristics of the suspension strut assemblies, it would also be possible to perform suspension control by adjusting the rigidity of a roll-stabilizer employed in the vehicle suspension. Such variable spring-force or damping-force stabilizers for vehicle suspension systems have been illustrated in the co-pending U.S. Pat. application Ser. No. 647,648, filed Sept. 6, 1984. The contents of the above-identified co-pending U.S. Patent Application are hereby incorporated by reference for the sake of disclosure.

What is claimed is:

1. A road surface sensing system for an automobile having sprung mass and unsprung mass and a suspension control system with damping characteristics that adapt automatically to changes in road surface conditions comprising:
   a sensor producing a signal representative of the magnitude of relative displacement between a vehicle body and a wheel axle, the signal having a first frequency component and a second frequency component;
   means for comparing amplitude of the first freqency component of the sensor signal with a predetermined reference level, said means for comparing producing one of first and second signals of respective predetermined levels indicative of a rough road surface and smooth road surface, respectively, on the basis of the comparison.

2. The road surface sensing system as set forth in claim 1 wherein said comparing means comprises a first comparator for comparing the amplitude of the first frequency component of the sensor signal with said predetermined reference level in excess of which the suspension control system operates in a stiffer of two damping modes.

* * * * *